(12) United States Patent
Safaee-Rad et al.

(10) Patent No.: US 9,478,173 B2
(45) Date of Patent: Oct. 25, 2016

(54) ADAPTIVE COLOR CORRECTION FOR DISPLAY WITH BACKLIGHT MODULATION

(75) Inventors: Reza Safaee-Rad, Etobicoke (CA); Min Dai, San Diego, CA (US); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/219,416

(22) Filed: Aug. 26, 2011

(65) Prior Publication Data

US 2012/0056911 A1    Mar. 8, 2012

Related U.S. Application Data

(60) Provisional application No. 61/378,217, filed on Aug. 30, 2010, provisional application No. 61/408,175, filed on Oct. 29, 2010.

(51) Int. Cl.
G09G 3/34 (2006.01)
G09G 3/20 (2006.01)
H04N 9/69 (2006.01)

(52) U.S. Cl.
CPC .......... *G09G 3/3406* (2013.01); *G09G 3/2003* (2013.01); *H04N 9/69* (2013.01); *G09G 2320/0209* (2013.01); *G09G 2320/0242* (2013.01); *G09G 2320/0271* (2013.01);
(Continued)

(58) Field of Classification Search
CPC .......................... G09G 3/3406; G09G 3/2003
USPC ....................................................... 345/690
See application file for complete search history.

(56) References Cited

U.S. PATENT DOCUMENTS 5,196,927 A    3/1993  Warner
5,949,496 A *  9/1999  Kim .............................. 348/645
(Continued)

FOREIGN PATENT DOCUMENTS

CN    1440205 A    9/2003
EP    1136979 A2   9/2001
(Continued)

OTHER PUBLICATIONS

Kerofsky et al., "Brightness Preservation for LCD Backlight Dimming," Sharp Technical Journal, pp. 50-57, 2007.
(Continued)

*Primary Examiner* — Michael Faragalla
*Assistant Examiner* — Chayce Bibbee
(74) *Attorney, Agent, or Firm* — Shumaker & Sieffert, P.A.

(57) ABSTRACT

The techniques of this disclosure are applicable to backlight display devices. For such devices, the backlight may have different backlight intensity settings in order to promote power conservation. The techniques of this disclosure may apply different adjustments to the display, depending on the backlight intensity setting. In one example, different color correction matrices may be applied for different backlight settings in order to achieve desirable adjustments in the device at the different backlight settings. The adjustments described herein may address chrominance shifts due to different backlight settings as well as cross-talk between color channels. The techniques may also be applicable to organic light emitting diode (OLED) displays that have different luminance settings, and some described techniques may be applicable to displays that have static or fixed luminance output.

16 Claims, 16 Drawing Sheets

(52) U.S. Cl.
CPC ... *G09G2320/0276* (2013.01); *G09G 2320/066* (2013.01); *G09G 2320/0626* (2013.01); *G09G 2320/0666* (2013.01); *G09G 2320/0693* (2013.01); *G09G 2360/16* (2013.01)

(56) References Cited

U.S. PATENT DOCUMENTS

| | | | |
|---|---|---|---|
| 6,243,059 B1* | 6/2001 | Greene et al. ................ | 345/88 |
| 6,300,931 B1 | 10/2001 | Someya et al. | |
| 7,342,592 B2 | 3/2008 | Feng | |
| 7,515,160 B2 | 4/2009 | Kerofsky | |
| 2002/0021292 A1 | 2/2002 | Sakashita | |
| 2003/0137606 A1* | 7/2003 | Rumreich ................ | G09G 3/20 348/675 |
| 2006/0038825 A1 | 2/2006 | Sakashita | |
| 2006/0187233 A1 | 8/2006 | Diefenbaugh et al. | |
| 2006/0262078 A1 | 11/2006 | Inuzuka et al. | |
| 2006/0262111 A1 | 11/2006 | Kerofsky et al. | |
| 2006/0274217 A1 | 12/2006 | Bae et al. | |
| 2008/0150880 A1 | 6/2008 | Inuzuka et al. | |
| 2009/0179881 A1 | 7/2009 | Hibi | |
| 2009/0207127 A1 | 8/2009 | Huang et al. | |
| 2009/0256811 A1 | 10/2009 | Pasquariello | |
| 2009/0310022 A1* | 12/2009 | Sakanoue et al. ............ | 348/571 |
| 2010/0053222 A1* | 3/2010 | Kerofsky ................ | 345/690 |
| 2011/0069094 A1 | 3/2011 | Knapp | |

FOREIGN PATENT DOCUMENTS

| | | | |
|---|---|---|---|
| EP | 1330131 A2 | 7/2003 | |
| JP | 2002031846 A | 1/2002 | |
| JP | 2006292914 A | 10/2006 | |
| JP | 2006323130 A | 11/2006 | |
| JP | 2007114341 A | 5/2007 | |
| JP | 2008076687 A | 4/2008 | |
| JP | 2008083439 A | 4/2008 | |
| JP | 2008102379 A | 5/2008 | |
| JP | 2008304587 A | 12/2008 | |
| JP | 2009081849 A | 4/2009 | |
| JP | 5066501 B2 | 11/2012 | |
| KR | 20030063221 A | 7/2003 | |
| WO | WO9851070 A1 | 11/1998 | |

OTHER PUBLICATIONS

Imatest—Color correction matrix, found at http://www.imatest.com/docs/colormatrix.html, first accessed Jul. 12, 2010, 4 pp.
CIE 1931 color space, Wikipedia page, last updated Jun. 7, 2010, 10 pp.
Dyble, "Impact of Dimming White LEDs: Chromaticity Shifts Due to Different Dimming Methods," Fifth International Conference on Solid State Lighting, Proceedings of SPIE 5941, pp. 291-299, 2005.
U.S. Appl. No. 13/219,406, by Reza Safaee-Rad, filed Aug. 26, 2011.
International Search Report and Written Opinion of international application No. PCT/US2011/049549, dated Mar. 2, 2012, 12 pp.
Cheng, Y.K. et al., "Colorimetric Characterization of High Dynamic Range Liquid Crystal Displays and Its Application," IEEE Journal of Display Technology, Jan. 1, 2009, vol. 5, No. 1, 6 pp.
Hong, G. et al., "A Study of Digital Camera Colorimetric Characterization Based on Polynomial Modeling," University of Derby—Colour and Imaging Institute, Feb. 2001, vol. 26, No. 1, 9 pp.
Tamura, N. et al., "Masking model for accurate colorimetric characterization of LCD," Journal of the Society for Information Display, Jan. 1, 2003, vol. 11, No. 2, 7 pp.
First Office Action from Japanese counterpart application No. 2013-527163 dated Jan. 21, 2014, 7 pp.
Notice of Grounds for Rejection from corresponding Korean Application No. 2013-7007769 dated Feb. 25, 2014 (includes an English translation) 8 pages.
Hulze et al., "51.3: Driving an Adaptive Local Dimming Backlight for LCD-TV Systems," SID 2008 International Symposium, Society for information Display, Los Angeles, USA,, May 18, 2008, pp. 772-775.
Office Action dated Jun. 20, 2013, from U.S. Appl. No. 13/219,406, 21 pp.
Response to Office Action dated Jun. 20, 2013, from U.S. Appl. No. 13/219,406, filed Sep. 20, 2013, 15 pp.
International Preliminary Report on Patentability from PCT/US2011/049549 dated Sep. 24, 2012 (13 pages).
International Preliminary Report on Patentability from PCT/US2011/049546 dated Dec. 12, 2012 (19 pages).
Office Action from U.S. Appl. No. 13/219,406 dated Jan. 29, 2014 (18 pages).
Office Action from counterpart Chinese Application No. 201180041543.2, dated Jul. 22, 2013, and translation thereof, 21 pp.

* cited by examiner

ADAPTIVE COLOR CORRECTION FOR DISPLAY WITH BACKLIGHT MODULATION

This application claims the benefit of U.S. Provisional Application No. 61/378,217, filed Aug. 30, 2010, and U.S. Provisional Application No. 61/408,175, filed Oct. 29, 2010, each of which is hereby incorporated by reference in its entirety.

TECHNICAL FIELD

The disclosure relates to display devices and, more particularly, to the calibration and control of color output for a display device.

BACKGROUND

For a wide variety of devices that include a display, it is highly desirable to render accurate and consistent color on the display. Devices that include a display may include, but are not limited to, digital televisions, wireless communication devices, personal digital assistants (PDAs), laptop or desktop computers, tablet computers, digital cameras, video cameras, digital media players, video game consoles, video gaming devices, cellular or satellite radio telephones, smartphones, and the like. Many such devices use backlight displays, which may also be referred to as transmissive displays.

Backlight displays include a light source (i.e., a backlight) that illuminates optical elements of the respective displays. The optical elements of the display may receive input signals, for example, from a processor, video circuit, or a display driver. The input signals define the images that are to be displayed by the backlight display. The backlight display may alter the light from the light source as it passes through the optical elements of the display in order to produce visual representations of the images defined by the input signals. Accurate rendition of color can be challenging in backlight displays for a variety of reasons. Other types of displays may have similar challenges, including organic light emitting diode (OLED) displays that have individually controllable emissive elements.

SUMMARY

In general, aspects of this disclosure are directed to the characterization and calibration of a display device to improve the accuracy of color on the display device. The techniques of this disclosure include processes for characterizing and calibrating a display, which may be applied by a device manufacturer to improve the display performance. The techniques of this disclosure may also include processes of applying characterization and calibration adjustments to a display during operation of a device.

In some examples, this disclosure describes color-correction techniques for display devices that employ backlight modulation. Changes in backlight level can result in spectral shifts in the color output of a display. This disclosure describes techniques for characterizing and calibrating a display to generate color-correction matrices for different backlight levels associated with the display. The backlight level of the display is adjusted, e.g., reduced, until the change in color response of the display from the previous backlight level is changed above a particular threshold. Coefficients of color-correction matrices are then generated at the new backlight level, such that the color response is relatively similar to the color response at a default backlight level, e.g., 100%. The generated coefficient matrices may then be stored in the device for subsequent retrieval during display, based on the backlight level of the display.

In other examples, this disclosure describes color-correction techniques for applying color-correction based on a backlight level adjustment. This disclosure describes techniques for adaptively correcting color image data based on backlight level so that a display provides a desired color output. In some examples, a display processor may provide a plurality of color-correction matrices associated with the device and stored thereon. Each of the color-correction matrices may correspond to an adjusted backlight level or range of backlight levels of the display device. The display processor may selectively apply one of the color-correction sets to color image data applied to the display based on a currently-selected backlight level. By selectively applying a color-correction set associated with a particular adjusted backlight level to the color image data, the techniques of this disclosure may compensate at least in part for spectral shift in the color response of the display that may occur due to backlight modulation. In one example, the color-correction matrices may account for color channel cross-talk, which may account for the effect on one or more color channels on other one or more color channels.

In one example, this disclosure describes a method of calibrating a display device, the method comprising generating coefficients of two or more different color correction matrices at two or more different luminance settings of the display device, wherein the coefficients adjust each of red, green and blue channels of the display device at the two or more different luminance settings, and storing the coefficients of the two or more different color correction matrices in the display device for application in rendering color by the display device.

In another example, this disclosure describes a device comprising a display configured to operate at different luminance settings, a processor that generates coefficients of two or more different color correction matrices at two or more different luminance settings of the display, wherein the coefficients adjust each of red, green and blue channels of the display at the two or more different luminance settings, and a memory for storing the coefficients of the two or more different color correction matrices in the display for application in rendering color by the display.

In another example, this disclosure describes a device comprising means for generating coefficients of two or more different color correction matrices at two or more different luminance settings of a display, wherein the coefficients adjust each of red, green and blue channels of the display at the two or more different luminance settings, and means for storing the coefficients of the two or more different color correction matrices in the display for application in rendering color by the display.

The techniques described in this disclosure may be implemented at least in partially in hardware, possibly using aspects of software or firmware in combination with the hardware. If implemented partially in software or firmware, the software or firmware may be executed in one or more hardware processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution in a processor, cause the processor to generate coefficients of two or more different color correction matrices at two or more different luminance settings of a display device, wherein the coefficients adjust each of red, green and blue channels of the backlight display device at the two or more different luminance settings, and store the coefficients of the two or more different color correction matrices in the display device for application in rendering color by the display device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
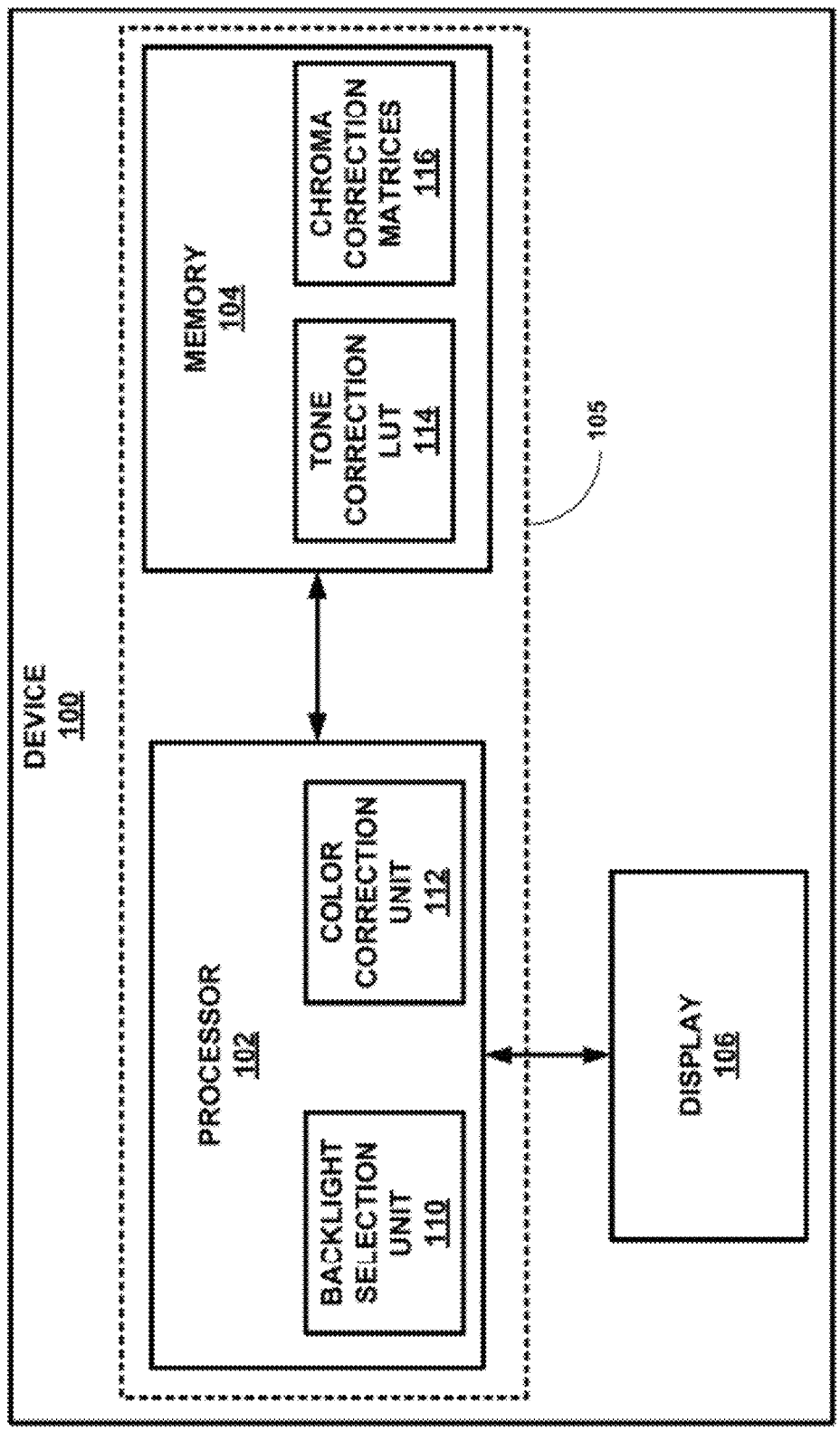
FIG. 1 is a block diagram illustrating an exemplary backlight display device consistent with this disclosure.

Energy consumption is important for various computing devices, and especially important for mobile devices, which are typically battery-powered. Mobile devices, as an example, are often designed to include measures that reduce the amount of energy consumption and thereby extend battery life. One such measure is backlight modulation, e.g., reduction in backlight, for displays that make use of backlighting. The ability to reduce backlight levels may be helpful in reducing power consumption by a display, and extending battery life of the mobile device incorporating the display. However, backlight modulation may alter the color response of the display, causing the display to produce inconsistent visible color output over a range of backlight levels. In particular, backlight modulation may cause spectral shifts in the backlight spectral power distribution (SPD). The spectral shift may significantly affect the color response of the display and affect color accuracy and quality of displayed objects. Some techniques used for color-correction for mobile device displays are performed using an assumed backlight level of 100%. Such techniques do not address spectral shifts that can result from different levels of backlight intensity. Therefore, it may be desirable to adjust the displayed color at different backlight level adjustments to retain a relatively high color quality.

This disclosure concerns characterization and calibration of a display device to improve the accuracy of color on the display device. Characterizing and calibrating a display may include one or more processes, which may be applied by a device manufacturer to improve the display performance The amount of chromaticity shift (or spectral shift) due to backlight dimming depends on the backlight technology used in the display, and therefore, may vary from one device to another, and from one type of display to another. Therefore, characterizing and calibrating a display during manufacture may yield more accurate results specific to the display and device. The techniques of this disclosure may also include application of characterization and calibration adjustments, established during manufacturing, to a display during operation of a device.

The techniques of this disclosure may be applicable to backlight display devices that include a backlight display (also commonly referred to as a transmissive display), although the techniques are not necessarily limited to backlight display devices. Exemplary devices that may use a backlight display include digital televisions, wireless communication devices, personal digital assistants (PDAs), laptop or desktop computers, digital cameras, video cameras, digital media players, video gaming devices, cellular or satellite radio telephones, smartphones, or any device having a display that uses a backlight. For such devices, the backlight may have different backlight intensity settings, e.g., 100 percent, 75 percent, 50 percent, 20 percent, and so forth. The backlight intensity settings may be, for example, relative to the maximum intensity level associated with the display.

While the techniques of this disclosure are described using the example of displays that use backlight modulation (e.g., LCDs), the techniques may be applicable to other types of displays that have luminance adjustment capabilities, such as organic light emitting diode (OLED) displays and active-matrix organic light-emitting diode (AMOLED) displays. OLED and AMOLED displays include the ability to adjust luminance of the output, but do not include any backlight. OLED and AMOLED displays are based on electroluminescence principles and include a material which emits light in response to the passage of an electric current. Additionally, some aspects of this disclosure may be applicable to displays that have fixed or static luminance output. For example, some aspects of this disclosure are directed to techniques for controlling color output of a display device, and particularly to backlight display devices, other devices that have luminance adjustment capabilities, and displays that have fixed luminance output.

The techniques of this disclosure may apply different adjustments to the display (e.g., apply different adjustments to color image data used to drive the display), depending on the backlight intensity setting. Specifically, different color correction matrices may be generated and applied for different backlight settings in order to achieve desirable adjustments in the device at the different backlight settings. The adjustments described herein may address chrominance shifts due to different backlight settings as well as inter-color channel cross-talk. Cross-talk may be caused by an effect that one color channel has on another color channel, and cross-talk may vary in the different backlight settings. The techniques described herein for addressing cross-talk may be applicable to backlight display devices, other types of displays that have luminance adjustment capabilities, and even for display devices that have static luminance output. In general, RGB cross-talk may be due to at least two factors: (a) optical (e.g., RGB filters) crosstalk and (b) electrical RGB crosstalk.

In one example, this disclosure describes color-correction techniques for display devices that employ backlight modulation. Changes in backlight level can result in spectral shifts in the color output of a display. This disclosure describes techniques for adaptively correcting color image data based on backlight level adjustments so that a display provides a desired color output. In some examples, a display processor may provide a plurality of color-correction matrices. Each of the color-correction matrices may correspond to an adjusted backlight level or range of backlight levels of the display device. The color-correction matrices may be determined during manufacturing, as noted above, and may vary from one type of display to another. Similar techniques to those used in backlight modulation settings may be applicable to displays that make other types of luminance adjustments (i.e., devices that adjust luminance without use of any backlight, such as devices that use OLED or AMOLED displays).

In the example of backlight modulation, a display processor may selectively apply one of the color-correction matrices to color image data supplied to the display based on a currently-selected backlight level. By selectively applying a color-correction matrix associated with a particular adjusted backlight level to the color image data, the techniques of this disclosure may compensate, at least in part, for spectral shift in the color response of the display that may occur due to backlight modulation. The color correction matrices may comprise color corrections that adjust for chrominance response. In addition, tone response correction may be performed to adjust the luminance response. In some examples, tone response may be corrected via application of a relatively small lookup table for each individual color channel, while color response may be corrected by application of a color-correction matrix to all color channels.

In one example, a memory may store data corresponding to the plurality of color correction matrices. Each color correction matrix may include correction values that may be applied to color image pixel values to correct, i.e., adjust the pixel values to desired pixel values. Each color correction matrix may be designated for one of a plurality of backlight intensity levels, or for one of a plurality of backlight intensity level ranges, for the display device.

By providing multiple color correction matrices for different backlight levels, color variation due to spectral shifts that result from changes in backlight levels may be reduced or eliminated. Furthermore, the techniques of this disclosure can address color inaccuracies due to cross-talk between color channels in the different backlight settings. The color correction matrices may include correction values that are selected so that the display produces a desired color response over a range of different backlight levels, eliminating problems caused by spectral shifts in different backlight levels and different levels of cross-talk in the different backlight levels.

In some examples, with selective color correction, the color response may be substantially uniform over the range of different backlight levels, thereby producing relatively more accurate and consistent color output for the different backlight levels. In other examples, the color response may not be uniform, but may be selected to provide a desired color output for different backlight levels. In each case, the color correction matrix is selected for a backlight display based on the current backlight level.

Color response may generally refer to the color output of the display in response to a given set of color input data. More particularly, color response may refer to color output of the display produced by a combination of color channels, e.g., red (R), green (G) and blue (B), in response to color image data specifying pixel values for the color channels. In some examples, each color correction matrix may take the form of a matrix for multi-dimensional color correction, as will be described in more detail below. The techniques of this disclosure may apply both tone adjustments and color adjustments. The tone adjustments may essentially adjust for inaccuracies in luminance, while color adjustments may adjust for inaccuracies in chrominance. As noted above, color adjustments may address both color shifts due to different backlight settings, and cross-talk among the color channels, which may be different at different backlight settings. Both the tone adjustments and color adjustments may comprise adjustments to color components, e.g., R, G, B values, which are used to drive the display. While the following discussion uses the example of adjustments using color components in the RGB color space, it should be understood that the techniques of this disclosure may be applicable in other color spaces.

In one example of this disclosure, calibration techniques may be utilized during manufacturing to generate the color corrections matrices. In some examples, calibration may involve determining appropriate gamma correction for different color channels based on display tone response. The gamma correction may be selected to produce desired tone or luminance output for each one of the different color channels. Calibration for the display color response may be then performed at different levels of backlight. In some examples, the color response may be calibrated with reference to a set of calibration color values, which may be arranged as color patches, e.g., such as those provided in the well known Macbeth color checker test chart. According to techniques of this disclosure, a color correction matrix, when applied for a corresponding backlight level, may drive the color response (e.g., RGB color response) such that the color accuracy of displayed image remains substantially intact due to the spectral shift of the backlight. In one aspect of this disclosure, a color correction module may select and apply the appropriate color correction matrix in response to changes in the display panel backlight level.

FIG. 1 is a block diagram illustrating an exemplary device 100 consistent with this disclosure. Device 100 may comprise a stand-alone device or may be part of a larger system. As non-limiting examples, device 100 may comprise a digital television, a wireless communication device, a personal digital assistants (PDAs), a laptop or desktop computer, a digital camera, a video camera, a digital media player, a video gaming device, a cellular or satellite radio telephone, a so-called "smartphone," or any other device that makes use of a backlight display. Device 100 may be included in one or more integrated circuits or integrated circuit chips. Device 100 may itself include a backlight display (i.e., display 106), but in some examples, device 100 may comprise a host device that drives a display coupled to the host device, in which case display 106 would be external to device 100.

Device 100 may be capable of processing a variety of different data types and formats. For example, device 100 may process still image data, audio data, video data, or other multi-media data. In the example of FIG. 1, device 100 includes a processor 102, which may be referred to as a mobile display processor (MDP). Processor 102 of device 100 may comprise a central processing unit (CPU), a digital signal processor (DSP), a graphics processing unit (GPU), or any processor capable of processing color data. In some examples, device 100 may include other components, such as encoder or decoder units (e.g., one or more "CODECs"), a modem, a transmitter, a battery, and other units common in mobile device. Thus, FIG. 1 is generally simplified for clarification purposes and ease of illustration. The functionality associated with processor 102 may be provided within a dedicated display processor, one or more of the processors mentioned above, or other processing circuitry. Device 100 may be capable of executing various applications, such as graphics applications, image applications, video applications, audio-video applications, video gaming applications, communications applications, digital camera applications, instant messaging applications, mobile location applications, other multi-media applications, or the like.

In the example of FIG. 1, device 100 additionally includes memory 104 and display 106. Processor 102 may be coupled to memory 104 and backlight display 106. Direct connections or a shared system bus may be used to couple processor 102 to memory 104 and backlight display 106. Processor 102 and memory 104 may be viewed as an apparatus 105 (e.g., a chip set) consistent with this disclosure. As shown in FIG. 1, processor 102 may comprise a backlight selection unit 110 and color correction unit 112.

Memory 104 may store instructions that, when executed by processor 102, define units 110 and 112 within processor 102. Additionally, memory 104 may store data such as, for example, display data that may be used by processor 102 to configure display settings. Memory 104 may also store color correction data that may be accessible to processor 102 in order to facilitate color correction by processor 102. In particular, memory 104 may include both tone correction data, such as a tone correction lookup table (LUT) 114, and color correction matrices 116. Different color correction matrices may be defined for different backlight settings associated with backlight display 1006 so that color correction varies as a function of the backlight setting of backlight display 1006.

In one aspect, display 106 may comprise a backlight display device, such as an LCD (liquid crystal display), or other form of display device. Other forms of output devices may be used within device 100 including different types of display devices, audio output devices, and tactile output devices. Again, although display 106 is illustrated as being part of device 100, in some cases, display 106 could be an external display that is external to device 100 but driven by data that is generated by processor 102.

During operation of device 100, processor 102 may receive input data and execute one or more instructions in order to generate output data that may be used to drive display 106. Processor 102 may receive input data from memory 104 or from other applications operating on one or more processors of device 100. Processor 102 may receive, for example, input data (e.g., display data) associated with an image to be displayed on display 106. The input data may include one or more input data components. The input data may include display panel data, such as the content of an incoming image. Based on the content, processor 102 may determine an amount of reduction of backlight level of display 106. Input data may also include color pixel values associated with input image data for the image to be reproduced by display 106, which may also be referred to as display panel data. The image may comprise a still image or a frame of a video sequence. In some examples, device 100 may include other units, such as an image or video encoder/decoder (CODEC), and the pixel values may be generated by the CODEC and supplied to processor 102.

Processor 102 may process display data for display of an image, where the display date may include display panel data and image pixel data. Such processing may include retrieval of data associated with display 106, such as display characterization and calibration (DCC) data. An external device may perform DCC, e.g., during manufacturing of device 100, to obtain display data such as, tone correction LUT 114 and color correction matrices 116, which may be stored in memory 104, and retrieved by processor 102. Processor 102 may utilize the calibration data, e.g., color correction matrices 116, and apply it to an incoming image (e.g., the image pixel data) to perform panel color correction (PCC) of the image, among other functions (e.g., scaling, contrast adjustment, rotation, or other display effects). Processor 102 may also utilize tone correction LUT 114 to perform tone correction, or luminance adjustment.

As noted above, tone correction LUT 114 may be configured to define tone response adjustments for each of red, green and blue channels of backlight display 106. TABLE 2, below, may comprise one example of a suitable LUT for tone correction LUT 114, although this is merely one example for one specific display. The data within tone correction LUT 114 may be defined during a tone adjustment calibration process similar to that described in this disclosure.

Color correction matrices 116 may comprise two or more different color correction matrices associated with two or more different backlight settings of the backlight display device. The coefficients of the color correction matrices may be selected during a calibration process so as to adjust for chrominance shifts between the different backlight settings. In some examples, the color correction matrices 116 may be represented by two or more different sets of equations. The two or more different color correction matrices 116 may comprise matrices that are larger than 3 by 3. In one example, color correction matrices 116 comprise 3 by 4 matrices, and in another example, color correction matrices 116 comprise 3 by 11 matrices.

Processor 102 may be configured to process display data associated with display 106 such as, for example, display panel backlight information. In one example, processor 102 may automatically adjust the display panel backlight based on user selection and/or based on inactivity, by reducing the backlight level, and send the display information to display 106 to adjust display 106 accordingly. Processor 102 may determine the amount of reduction in backlight, e.g., expressed as a percentage of the amount of backlight at a normal level, where the normal level may be 100%, for example. The display data, e.g., image information that processor 102 sends to display 106, may also include brightness information and image information. Image information may include image data components such as, for example, color component information or red, green, and blue data. The image data may be associated with still images and/or video images/frames of a video sequence.

Processor 102 may access memory 104 and apply tone response adjustments stored in tone correction LUT 114. In addition, processor 102 may access memory 104, and apply two or more different color correction matrices 116 at two or more different backlight settings of the backlight display device 106. The coefficients of the color correction matrices 116 may be defined (e.g., selected during calibration of backlight display 106) so correct each color component and to adjust for cross-talk between the red, green and blue channels of the backlight display 106 at the two or more different backlight settings. Backlight selection unit 110 may determine the current backlight setting of backlight display 106, and based on the current backlight setting, color correction unit 112 may access the applicable color correction data from memory 104, and apply such data to input data for backlight display 106 in order to generate corrected input data that has more accurate color.

Accordingly, processor 102 may be configured to process the image data to establish a backlight level or a reduction in the backlight level at which the image is to be displayed. In one example, the backlight level may comprise a percentage representing the amount of backlight relative to the normal backlight (e.g., 78%). In another example, the backlight level may comprise a range of backlight (e.g., 75%-100%). Based on the backlight level, processor 102 retrieves a corresponding color correction matrix from memory 104. Processor 102 may then apply the backlight level to display 106 and the corresponding retrieved color correction matrix to the image data, resulting in an output image with tone and color correction based on the backlight level. For example, processor 102 may apply the color correction matrices to the red, green, and blue components to produce corrected values for application to display 106 as output image data. Display 106 may then display the output image at the associated backlight level with the corrected colors. In addition to color correction, processor 102 may also adjust the tone response of the image to correct the luminance response of the image. In some examples, the adjusted output image may resemble the colors of the output image at 100% backlight or another desired reference color palette.

The example of FIG. 1 is merely illustrative. In other examples, similar devices that do not include a backlight display may use the techniques of this disclosure. The adjustments described herein may address chrominance shifts due to different backlight settings (or different luminance setting) as well as inter-color channel cross-talk. Cross-talk may be caused by the effect that one color channel has on another color channel, and cross-talk may vary in the different backlight settings. The techniques may also be applicable to other types of displays that have luminance adjustment capabilities (e.g., OLED or AMOLED displays). OLED and AMOLED displays include the ability to adjust luminance of the output, but do not include any backlight.

In the example of display such as OLED or AMOLED displays, the device may look similar to that of FIG. 1, but backlight display 106 would be replaced with an OLED or AMOLED display or another display that has luminance adjustment capabilities. Furthermore, some aspects of this disclosure are directed to techniques for controlling color output of a display device, and these techniques may apply to backlight display devices, other devices that have luminance adjustment capabilities, and displays that have static luminance output. Accordingly, the example of FIG. 1 should not be considered limiting, but should be viewed as one example for implementing techniques of this disclosure.

Aspects of this disclosure may include techniques for display panel color correction calibration (PCC) to determine a plurality of color correction matrices for application to achieve PCC. In addition, the techniques of this disclosure include the application of the color correction matrices, which are generated during the calibration process. The application of the color correction matrices may occur during normal operation of the device in order to improve color output at different backlight levels. While the following description discusses the techniques of this disclosure in the RGB color space, it should be understood that these techniques may be modified for other color spaces and other display components or channels.

According to some example techniques of this disclosure, during operation of a device, a display panel backlight level or level range may be determined and the corresponding color corrections matrices retrieved and applied to the displayed image in addition to contrast adjustment. Additionally, the determined panel backlight level may be applied to the display. In this manner, the displayed image can be rendered with approximately the same color accuracy of the image when displayed at 100% backlight level or another desired reference level that produces accurate color rendering.

Typically, display tone responses and color responses may be significantly different from the desired responses. As a result, two corrections may be applied before generating and outputting image data to a display. According to the techniques of this disclosure, PCC provides color correction of the image data to correct the color response of the display at different backlight levels. Gamma correction may then be applied to color-corrected image data to correct the tone response of the display.

Figure 2A:
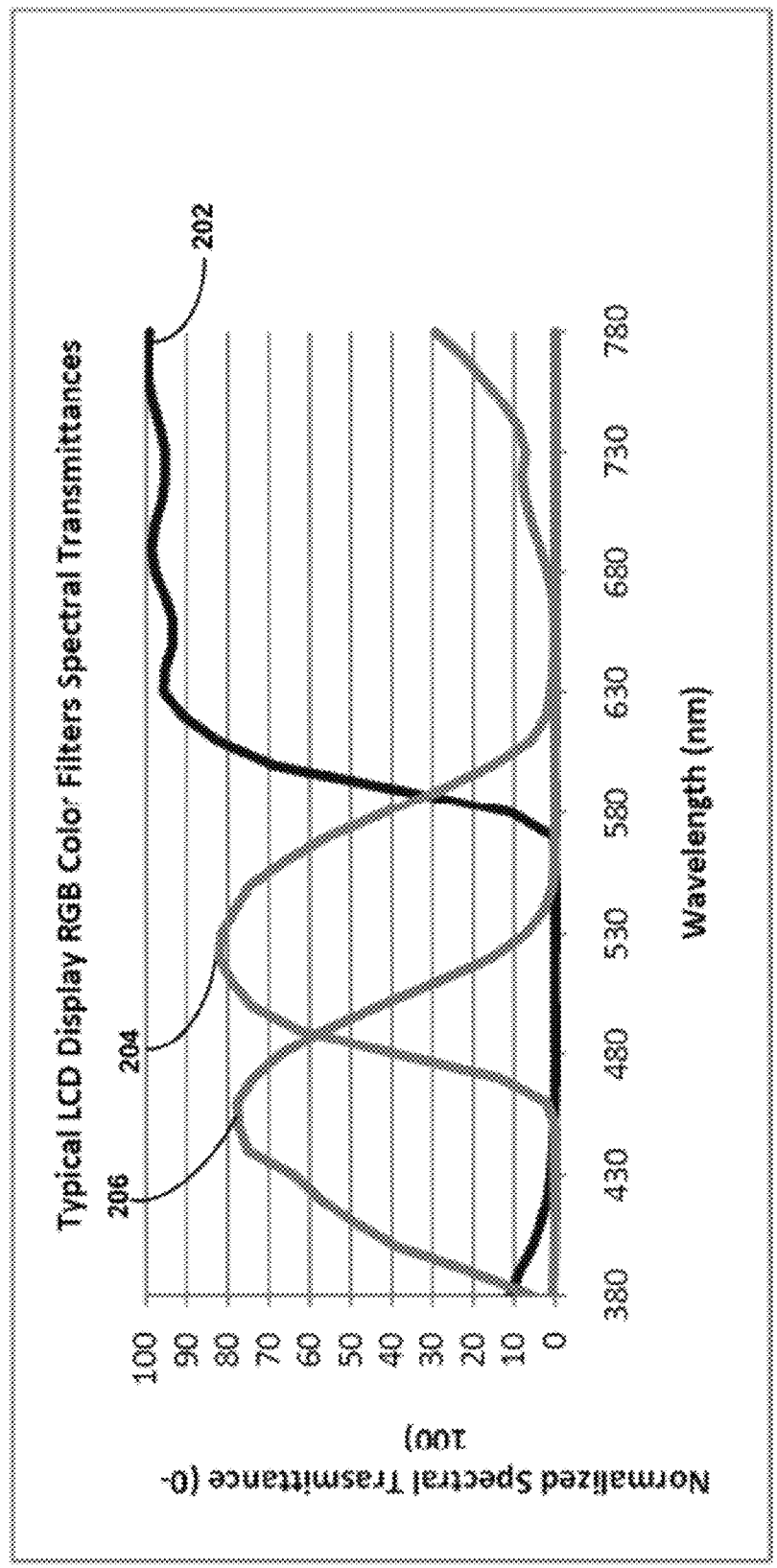
FIG. 2A is a graph illustrating exemplary spectral transmittances of red (R), green (G) and blue (B) color filters at different wavelengths of light.
Figure 2B:
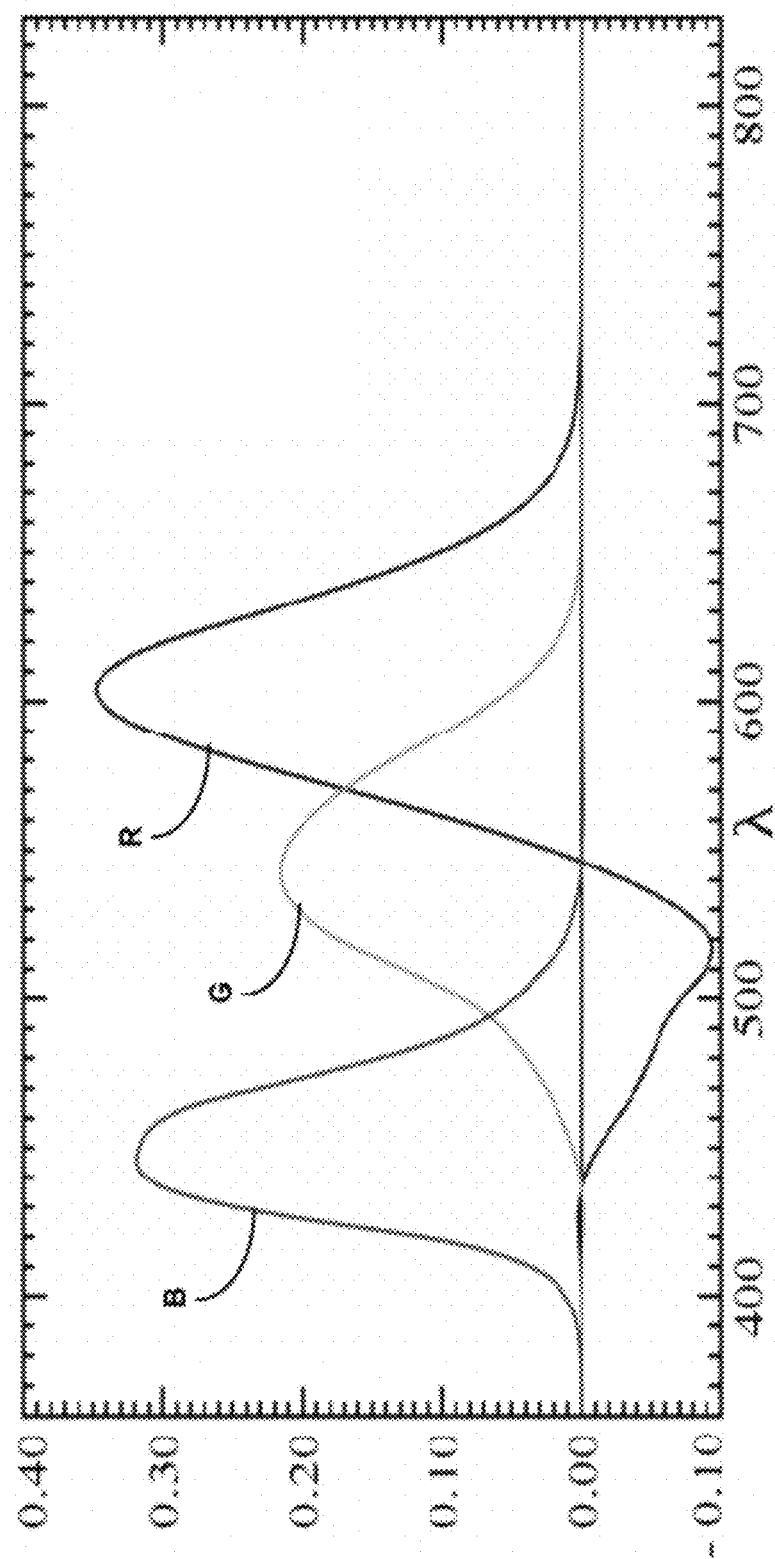
FIG. 2B is a graph illustrating RGB matching functions representing a human eye response.
Figure 2C:
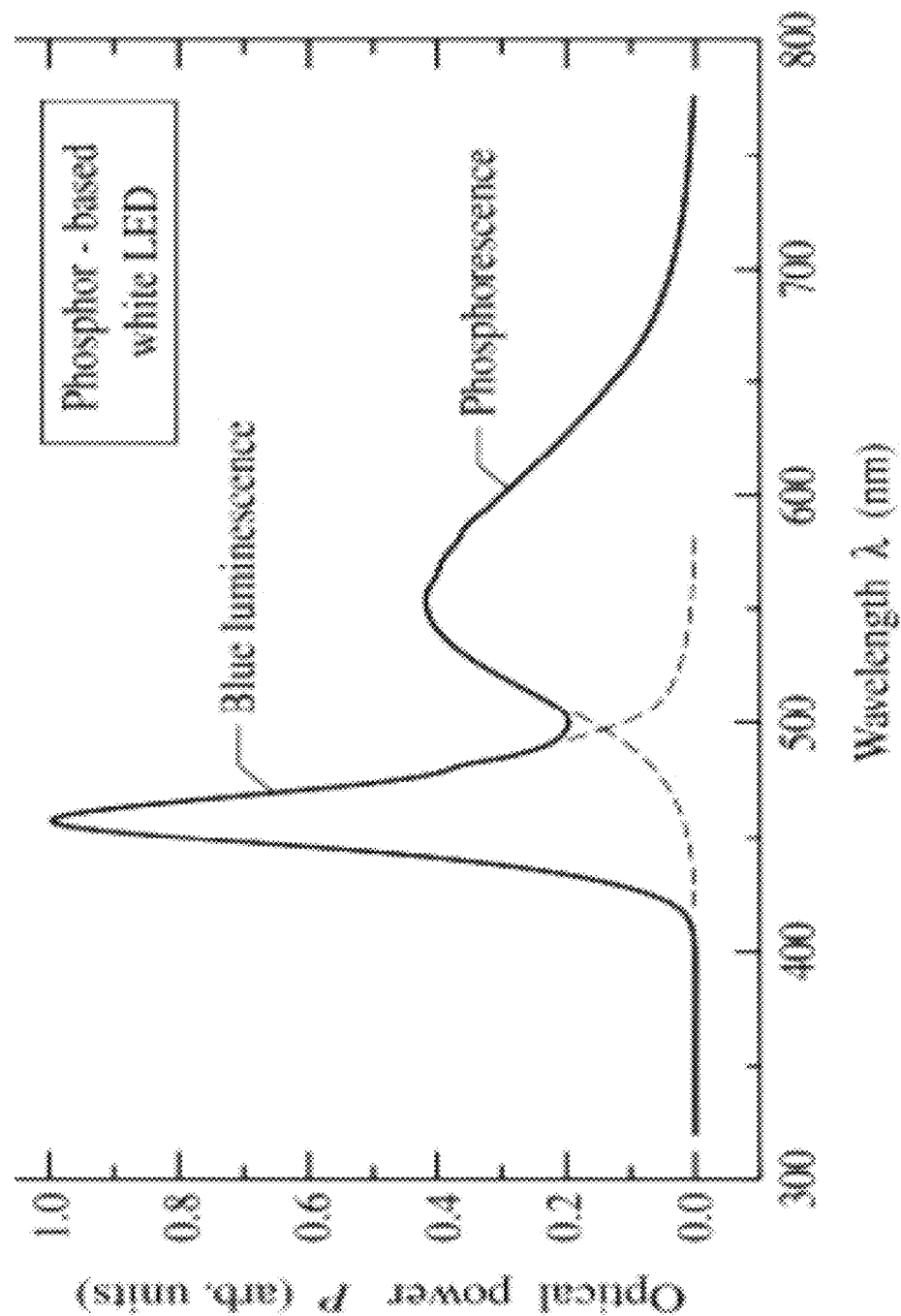
FIGS. 2C and 2D are graphs illustrating Spectral Power Distribution (SPD) of a white LED backlight source (FIG. 2C) and CIE Standard Daylight (outside lighting condition sunny day afternoon) (FIG. 2D), referred to as D65 Illuminant.
Figure 2D:
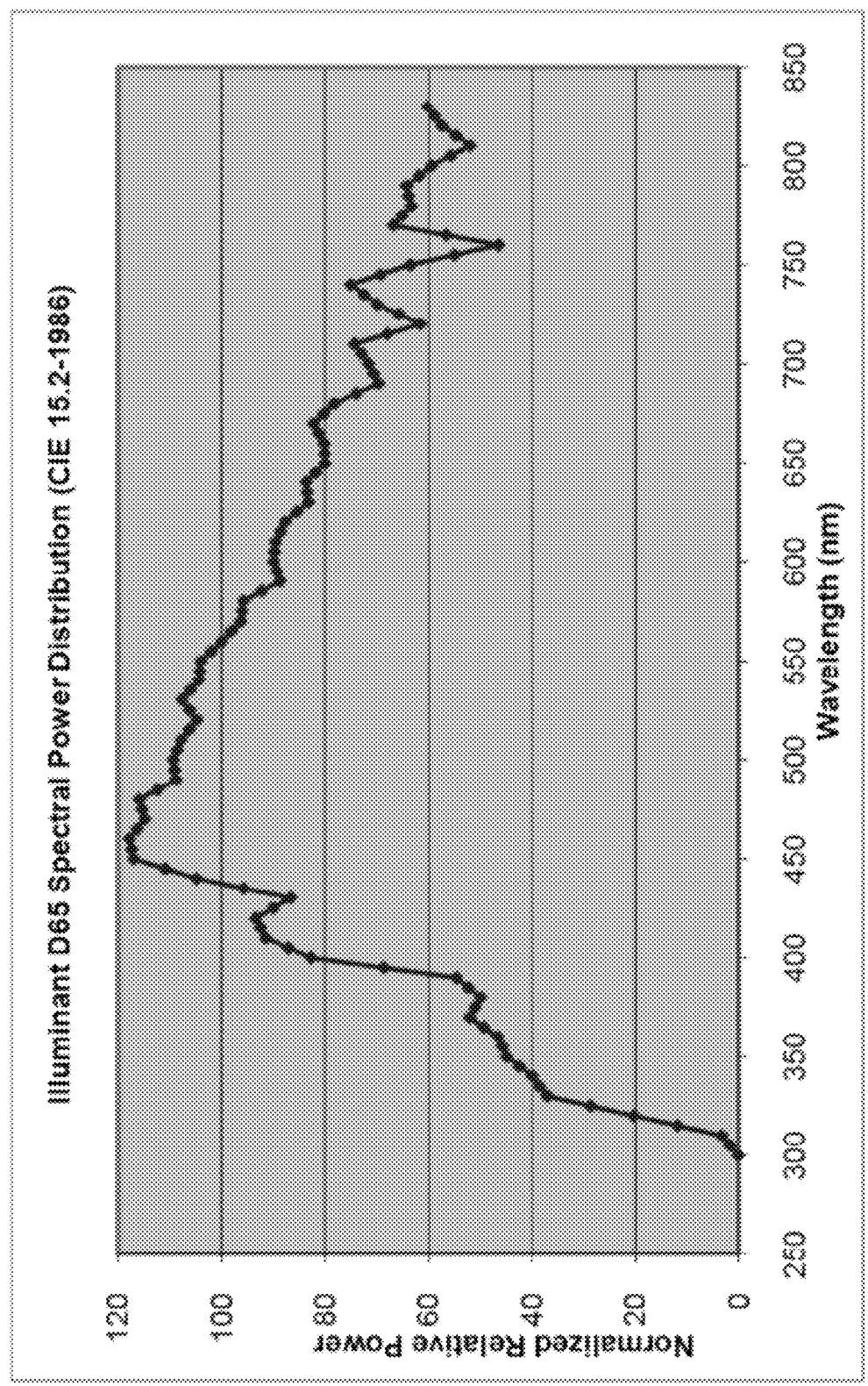

FIG. 2A is a graph illustrating spectral transmittances of exemplary red (R), green (G) and blue (B) color filters at different wavelengths of light. FIG. 2B is a graph illustrating the CIE 1931 RGB matching functions (representing human eye response). The graph of FIG. 2B may be used as a reference to compare with display color filter spectral transmittance. FIGS. 2A and 2B may demonstrate one type of color crosstalk. In particular, output by one channel (R, G or B) can cause output into one or more adjacent spectrums associated with another channel (R, G or B). Cross-talk is a general phenomenon with color output, but can vary depending on the backlight level. Another type of cross-talk (electrical RGB crosstalk) may also be measured and numerically presented. FIGS. 2C and 2D are graphs illustrating Spectral Power Distribution (SPD) of a WHITE LED backlight source (FIG. 2C) and CIE Standard Daylight (outside lighting condition sunny day afternoon) (FIG. 2D), referred to as D65 Illuminant D65 may be used as a reference for desired illumination condition for both displays and cameras. The significant difference between the FIGS. 2C and 2D is one of the factors that should be corrected in order to get the desired color response from a display.

TABLE 1, below, shows a numerical example of the differences between measured data for RGB primaries and white/black points of an exemplary LCD display relative to reference data, which may correspond to the expected output for that display.

TABLE 1

| | Measured data for the display | | | | Reference: Rec-709 | | |
|---|---|---|---|---|---|---|---|
| Color | Y (cd/m2) | x | y | CCT (K) | x | y | CCT (K) |
| White | 69.19 | 0.3020 | 0.3121 | 7347 | 0.3127 | 0.3290 | 6500 |
| Black | 0.13 | 0.24 | 0.24 | | | | |
| Red | 13.61 | 0.65 | 0.33 | | 0.64 | 0.33 | |
| Green | 47.37 | 0.31 | 0.62 | | 0.30 | 0.60 | |
| Blue | 7.04 | 0.15 | 0.07 | | 0.15 | 0.06 | |

As TABLE 1 illustrates, there can be significant differences between chromaticity coordinates (x and y) for white and black, and for red (R), green (G), and blue (B) primaries relative to reference data expected for the display. These measured differences may be due to differences in desired reference RGB primaries, xy chromaticity coordinates and what is actually produced for the display in the manufacturing process. There are also significant differences between the red, green, and blue luminance levels (Y), which may correspond to maximum luminance for each channel.

PCC may help minimize the differences between the display characteristics and desired reference characteristics. The differences, however, vary from one display to another and the change in color characteristics at differing backlight levels may vary from one type of display to another and from one device to another. Therefore, display characterization and calibration (DCC) may be performed (e.g., by a device manufacturer) to determine the appropriate color correction matrices for a particular display panel and/or a device to be used in PCC. The color correction matrices may then be applied during operation of the device. In some examples, DCC may be performed for a general class of devices (e.g., a particular model number). In other examples, DCC may be performed on individual devices. Thus, DCC may be performed at the time of device manufacturing. DCC produces data for color- and gamma-correction, as described in more detail below, and the produced data may be included in each corresponding device for use by device processor (e.g., processor 102 of FIG. 1) to perform color correction and gamma correction. The correction may account for both chromaticity shifts due to different backlight levels, as well as cross-talk between channels, which may also be affected by the different backlight levels.

DCC may take into consideration display tone response and display color response. Characterization and calibration may be performed at different display operating conditions, e.g., fixed backlight level and variable backlight levels. DCC may include characterization of the display through measurement, calibration through gamma and color correction matrices, and verification through linearity and color error checks.

Figure 3:
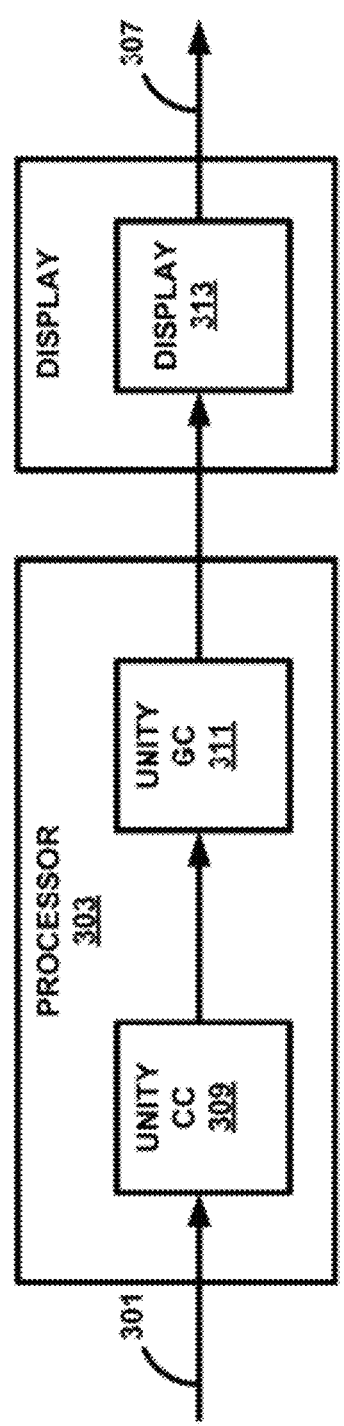
FIG. 3 is a block diagram illustrating an exemplary system for characterization of tone response of a display.

FIG. 3 illustrates an example system for characterization of tone response of a display. In one example, input 301 for characterization of the tone response of a display may be linear RGB associated with the display. Processor 303 may apply unity color correction (unity CC) 309 and unity gamma correction (unity GC) 311 to input 301. A unity CC matrix may be applied when it is determined that no color correction is required. For example, a 3 by 3 unity CC may be a matrix with the 3 diagonal elements equal to 1, while the remaining elements are equal to 0. Similarly, a unity GC LUT may be applied when it is determined that no tone response correction is required. The unity GC LUT entry values may be LUT[i]=i, where i represents the incoming R, G, or B value. As a result, no change is applied to the RGB values, when the unit GC LUT is applied.

Processor 303 may send the processed RGB inputs to display 313. In one example, during characterization of tone response of the display, RGB inputs may be varied to characterize the tone response by setting the value of the R channel to values from 0 to 255, while setting the G and B channels to 0, setting the value of the G channel to values from 0 to 255, while setting the R and B channels to 0, and setting the value of the B channel to values from 0 to 255, while setting the R and G channels to 0. The luminance of the displayed processed RGB inputs may then be measured, thereby obtaining output 307, which may indicate a measured RGB luminance associated with each color channel for the linear RGB inputs (i.e., input 301). By measuring the luminance associated with each color channel, the impact of the display on the luminance of each of the color channels may be characterized. The measured luminance may be also referred to as the tone response. Hereinafter, the measured luminance may be referred to as tone response.

Figure 4A:
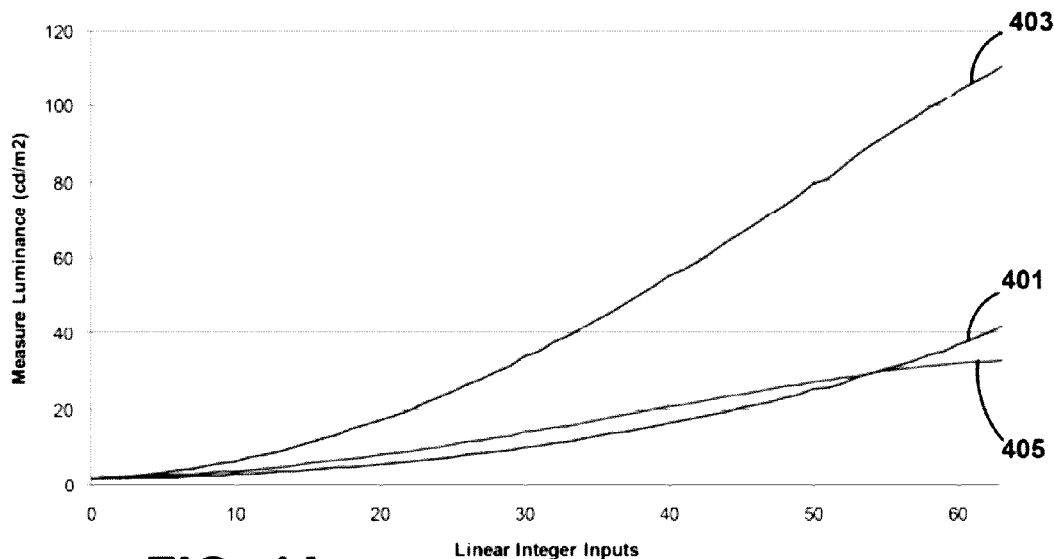
FIG. 4A is a graph illustrating an example of measured luminance output for each of the red (R), green (G), and blue (B) color channels of a display.

FIG. 4A illustrates one example of the tone response for each color channel (in candela/meter$^2$) over a range of linear integer inputs applied to the display as color input values (e.g., input 301 in FIG. 3). In one example, the tone response of a display may be obtained at 100% backlight level. Curves 401, 403, and 405 are the tone response curves for the outputs of the R, G, and B channels, respectively, in response to the color input values applied to the display device, as described above. Curve 401 corresponds to red, curve 403 corresponds to green and curve 405 corresponds to blue.

Figure 4B:
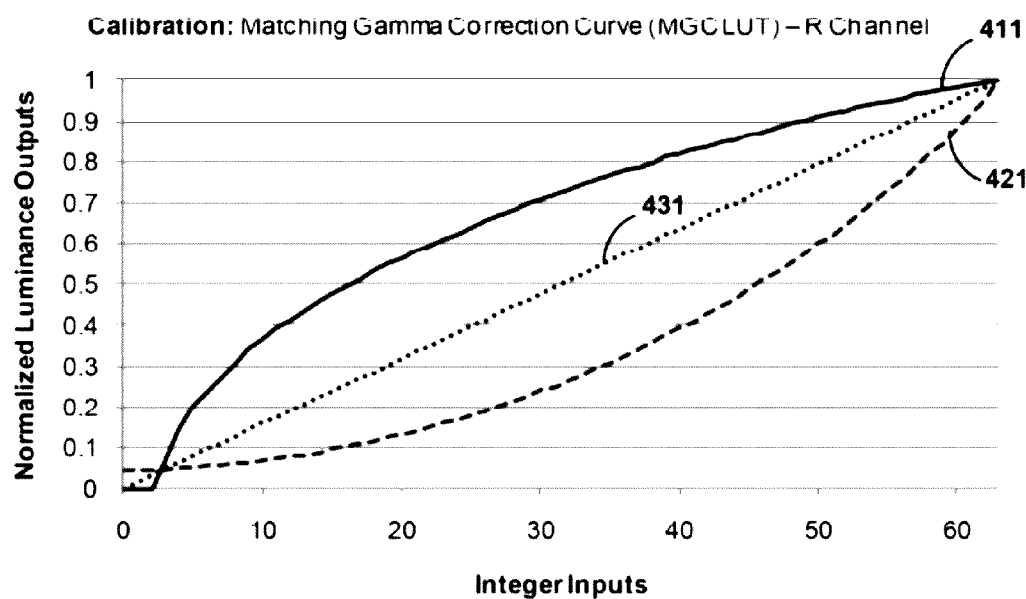
FIGS. 4B-4E are graphs illustrating exemplary gamma correction curves for each of the R, G, and B color channels of a display.
Figure 4C:
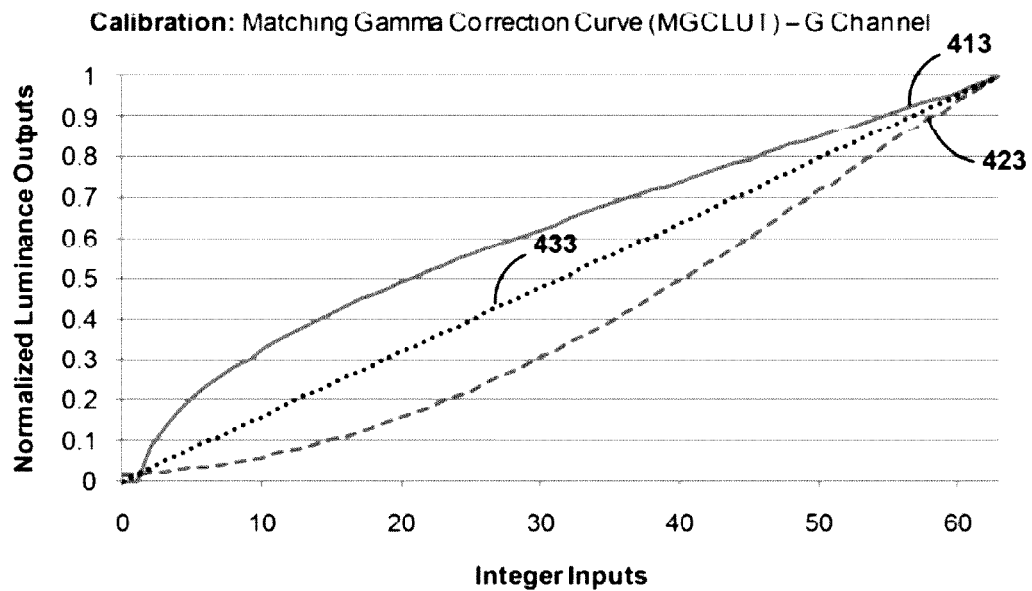
Figure 4D:
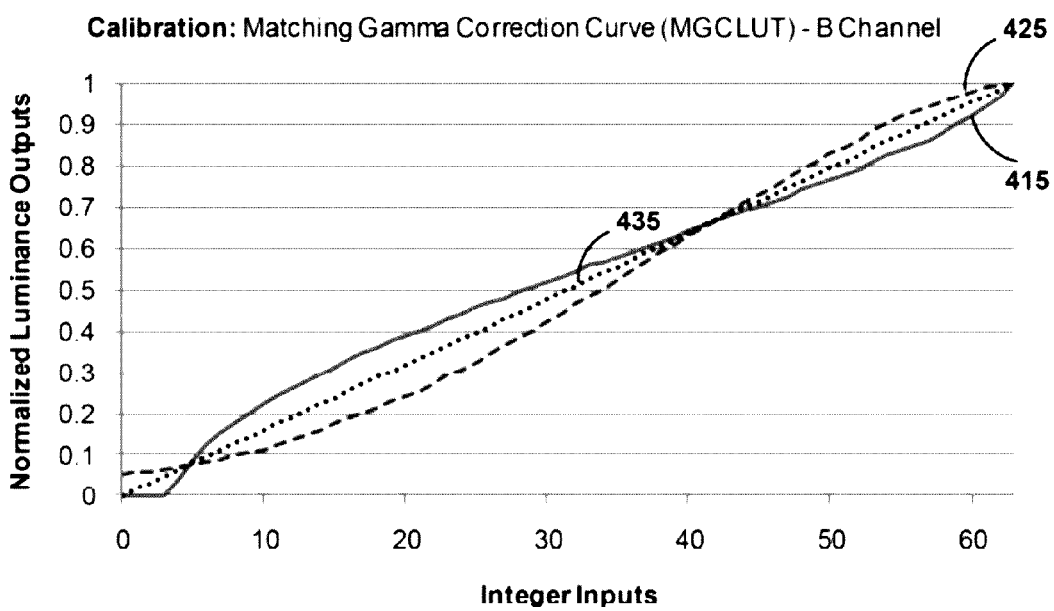

Given the tone response shown in FIG. 4A, calibration of the tone response may be performed at each backlight level by determining, for each tone response curve associated with each of the color channels, the matching gamma correction curve that results in a desired luminance output. In one example, the desired luminance output may be a linear net response. FIGS. 4B-4D illustrate one example of gamma correction curves 411, 413, and 415 for each of the R, G, and B channels, respectively. Gamma correction curves 411, 413, and 415 may also be referred to as tone adjustment curves. In FIGS. 4B-4D, the dashed curves 421, 423, and 425 (i.e., the actual response curve 421, 423, and 425) illustrate the normalized measured output luminance corresponding to the display tone response for each of the R, G, and B channels, respectively, as shown in FIG. 4A.

Figure 4E:
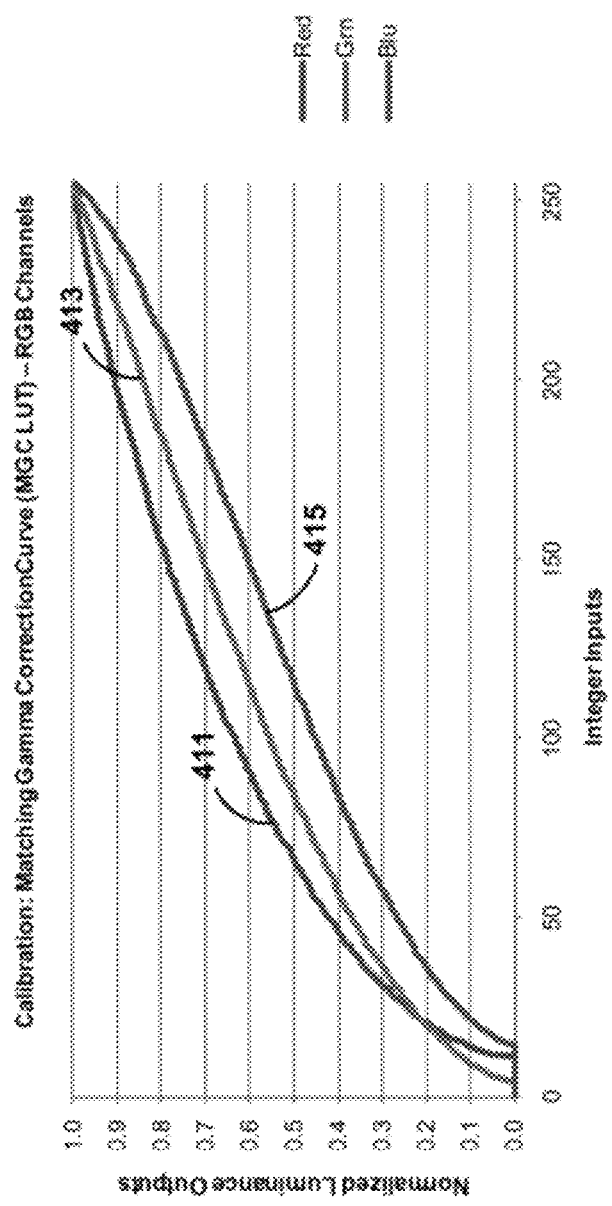

The actual response curves 421, 423, and 425 may be normalized such that the luminance values range from 0 to 1. The solid curves 411, 413, and 415 (i.e., tone adjustment curves or gamma correction curves) illustrate the gamma corrections relative to actual response curves 421, 423, and 425, respectively. The dotted lines 431, 433, and 435 represent the net tone response resulting from application of the gamma correction curve to the original tone response curve, where the net response is linear, as illustrated in these examples. FIG. 4E illustrates the gamma correction curves 411, 413, and 415 for each of the R, G, and B color channels of a display, respectively. Curve 411 corresponds to red (R), curve 413 corresponds to green (G), and curve 415 corresponds to blue (B).

FIGS. 4B-4D may be viewed as illustrating tone response adjustment curves (i.e., curves 411, 413 and 415), which are also shown in FIG. 4E. These graphs illustrate one way to identify and generate tone response adjustments. In this case, for each channel (e.g., for R, G and B channels), input values (e.g., along the X axis of FIGS. 4B-4D) can be mapped to adjusted output values according to tone response adjustment curves 411, 413 and 415. The desired tone response is illustrated as the linear dotted lines (i.e., desired tone response curves 431, 433 and 435) in each respective graph. The actual tone response is illustrated as the dashed lines (i.e., the actual response curves 421, 423 and 425) in each respective graph, and the luminance outputs needed to modify the actual tone response to the desired tone response are represented by curves 411, 413 and 415. As can be seen, the adjustment curves 411, 413, and 415 generally mirror the actual response curves 421, 423 and 425 about the desired tone response curves 431,433 and 435. Accordingly, by applying adjustment values sufficient to change the expected response from that of the actual response curves 421, 423 and 425 to that of adjustment curves 411, 413 and 415, the desired tone response curves 431,433 and 435 can be achieved.

Using the matching gamma correction curves, a matching gamma correction lookup table (MGCLUT) may be generated, storing the normalized luminance output value (between 0 and 1, inclusive) for different RGB channel input values (from 0 to 255). An example MGCLUT is shown below in TABLE 2, indicating normalized luminance outputs in the range [0-1] for each of the R, G, and B channels, based on integer inputs for each of the R, G, B channels, and quantized to 8 bits.

TABLE 2

| LUT Entry | Value | | |
|---|---|---|---|
| | Red | Green | Blue |
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0.031102 | 0 |
| 6 | 0 | 0.051431 | 0 |
| 7 | 0 | 0.069721 | 0 |
| 8 | 0 | 0.084120 | 0 |
| 9 | 0 | 0.097923 | 0 |
| 10 | 0 | 0.109876 | 0 |
| 11 | 0 | 0.120699 | 0 |
| 12 | 0.054677 | 0.130796 | 0 |
| 13 | 0.082007 | 0.140041 | 0 |
| 14 | 0.104861 | 0.151593 | 0 |
| 15 | 0.122501 | 0.161823 | 0.026108 |
| 16 | 0.138480 | 0.168985 | 0.040058 |
| 17 | 0.157532 | 0.176704 | 0.053553 |
| 18 | 0.169656 | 0.186445 | 0.066497 |
| 19 | 0.182988 | 0.194597 | 0.075944 |
| 20 | 0.196036 | 0.201628 | 0.085937 |
| ... | ... | ... | ... |
| 250 | 0.993399 | 0.985006 | 0.957873 |
| 251 | 0.994719 | 0.988005 | 0.964455 |
| 252 | 0.996040 | 0.991004 | 0.971849 |
| 253 | 0.997360 | 0.994003 | 0.980350 |
| 254 | 0.998680 | 0.997001 | 0.989797 |
| 255 | 1.000000 | 1.000000 | 1.000000 |

The results of calibration of the tone response may be verified by inputting linear RGB input values, applying the matching gamma correction value, and measuring the luminance output. If the calibration process is accurate, the output luminance curves should have a net linear response.

Figure 5:
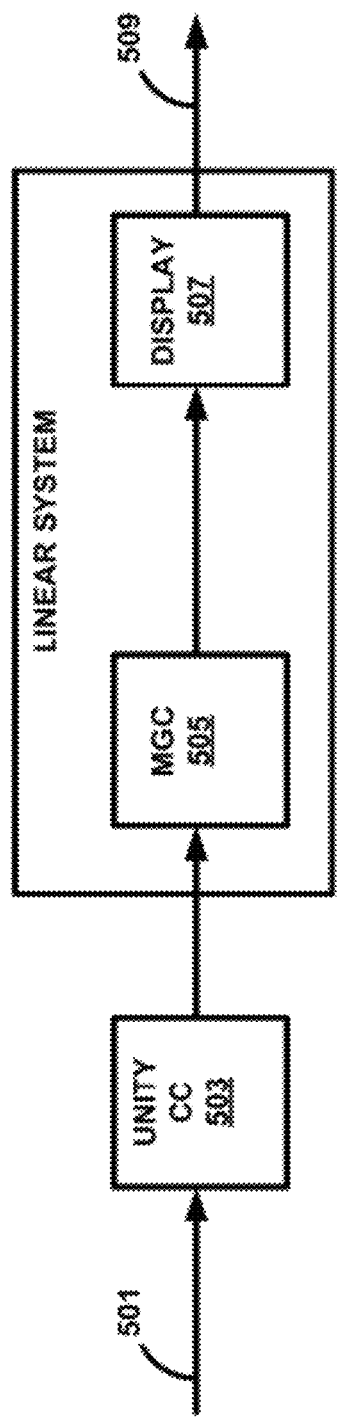
FIG. 5 is a block diagram illustrating an exemplary system that may be used for verification of a tone-response calibrated display.

FIG. 5 is a block diagram illustrating an example system for verification of a tone-response calibrated display. Verification of the tone response of a display may be performed by using linear RGB inputs 501, which may be processed by a processor (e.g., processor 102 of FIG. 1), which applies unity color correction 503 and the matching gamma correction (MGC) 505. The matching gamma correction may be based on the matching gamma correction values from an MGCLUT associated with the display and generated during calibration of the tone response, described above. The MGCLUT may be stored in a memory (e.g., memory 104 of FIG. 1), and retrieved by a processor (e.g., processor 102) for gamma correction.

Units 505 and 507 may collectively be referred to as a "linear system" insofar as these units provide net linear responses for each of the R, G, and B channels. The gamma corrected RGB inputs may be sent to display 507. The luminance of the displayed processed RGB inputs may then be measured and the tone response (or luminance) associated with each color channel for the linear RGB inputs is determined as measured RGB output 509. The tone response associated with each color channel may be measured by an external device, for example. In one example, where tone response of a display may not be affected by changes to backlight levels, the tone response characterization may be performed at one backlight level, and similarly applicable at all backlight levels.

Following calibration and verification of the display tone response as described above, DCC may be performed for the color response of the display. Characterization of the color response of a display may be performed by measuring reference color outputs for corresponding input reference linear color values. In one example, the colors of the so-called Macbeth color checker test chart are used as input. The Macbeth color checker chart has 24 reference colors that include 18 colors and 6 achromatic neutral colors (white, grays, and black). In other examples, more precise results may be achieved by utilizing a larger number of reference colors, e.g., a color checker with 108 reference colors. A color measurement may be obtained of the displayed colors using a measurement device, e.g., a colorimeter or a spectrophotometer.

The amount of color error produced by the display for each color input may be determined based on the difference between the output color and the corresponding input color reference indicated by the Macbeth color checker chart. The human eye can typically detect color differences that exceed 2 delta e (CIE), as designated by the International Commission on Illumination (or Commission Internationale de l'Éclairage (CIE)). That is to say, for example, two shades of a color may look the same to the human eye if the difference between them is 2 delta e (CIE) or less. During characterization of a display, the amount of difference between the input and output reference colors may be determined The input and output reference colors may be expressed in terms of their RGB components.

Figure 6A:
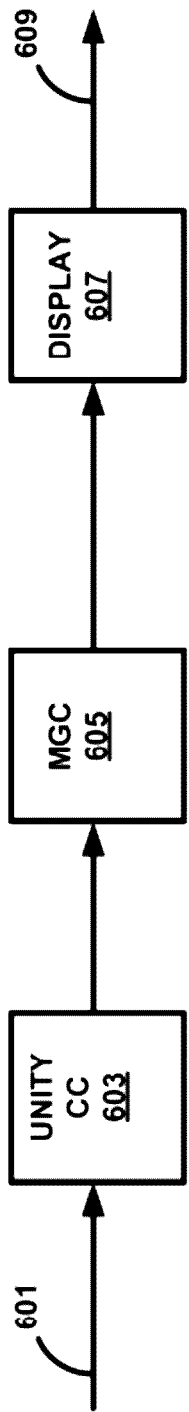
FIG. 6A is a block diagram illustrating an exemplary system for characterization of color response of a display.

FIG. 6A illustrates an example system for characterization of color response of a display. Input 601 for the characterization of the color response of a display may be, for example, reference linear color data (e.g., Macbeth colors), which may be processed by a processor (e.g., processor 102 of FIG. 1) that applies unity color correction 603 and the previously-obtained matching gamma correction (MGC) 605 using the MGCLUT stored in a memory (e.g., memory 104). The processed input color data is then sent to display 607. A color measurement device may obtain a measurement of the color response of the displayed colors for each set of color data and generate output 609, which may be a measured reference color. The difference between the measured reference color outputs 609 and input reference colors 601 (e.g., the Macbeth linear color values or other reference color values) can be used to determine the color error, i.e., the error in the color response of the display. The color error may then be obtained for the output colors and compared to the input colors, as shown in the example TABLE 3 below. In the table, "CC" refers to color correction.

TABLE 3

| CC Matrix | Color Error | | |
|---|---|---|---|
| size | Average | Max | Saturation |
| Reference | 0.743 | 2.33 | 98.12 |
| Without CC | 6.84 | 13.9 | 101.80% |

After characterization, calibration of the color response of the display may be performed by determining a corresponding color correction matrix (e.g., elements of a 3 by 1 color correction matrix). The color correction matrix may be determined for all the colors in the chart, using the minimum square error (MSE) method. Calculation of the color correction matrix of coefficients may involve applying MSE to the following equation:

$$[R_{cie}G_{cie}B_{cie}]=[CC\ matrix]*[R_d G_d B_d],$$

where $R_{cie}$ $G_{cie}$ $B_{cie}$ are the reference RGB values for K colors (e.g., 24), therefore, $[R_{cie}\ G_{cie}\ B_{cie}]$ is a 3 by K matrix. CC matrix is the color correction matrix, and is a 3 by 3 matrix, and $R_d\ G_d\ B_d$ are the measured RGB values, therefore, $[R_d\ G_d\ B_d]$ is a 3 by K matrix. Therefore, for each of the K colors, corrected RGB values are defined by a [3×1] column matrix, [RGB_Corrected]. The color correction matrix is defined by a 3 by 3 up to a 3 by N matrix: [M]. The measured RGB values are defined by a 3 by 1 matrix, [RGB_Measured], for each of the K colors, and therefore, $$[RGB\_Corrected]=[M]*[RGB\_Measured]$$

In some examples, the correction values may be expressed as coefficient values that provide color corrected RGB values ($R_{cie}\ G_{cie}\ B_{cie}$). The coefficients may be used in linear or polynomial regression equations to obtain color corrected RGB values from input RGB values ($R_d\ G_d\ B_d$). The coefficients may be stored as a 3 by N matrix, where N is 3 or more. When N is 3, linear regression may be used to obtain color corrected RGB values from input RGB values. The example equations below may represent one example of a 3 by 4 matrix that can be solved during color calibration, and then applied (based on the solved values for coefficients k) for color adjustment or correction during operation of the device.

$$R_{cie}=k_{rr}*R_d+k_{rg}*G_d+k_{rb}*B_d$$

$$G_{cie}=k_{gr}*R_d+k_{gg}*G_d+k_{gb}*B_d$$

$$B_{cie}=k_{br}*R_d+k_{bg}*G_d+k_{bb}*B_d$$

where the $k_i$ coefficients represent the color correction coefficients based on the performed calibration as discussed above. $R_d$, $G_d$, $B_d$ represent the display RGB values, and $R_{cie}$, $G_{cie}$, $B_{cie}$ represent the color corrected values. Each of the coefficients is associated with the one-channel contributions, or, the contribution of each of the red (R), green (G), and blue (B) channels alone. Therefore, $k_{rr}$ is the coefficient associated with the red channel contribution to the color-corrected red channel value, $k_{rg}$ is associated with the green channel contribution to the color-corrected red channel value, and $k_{rb}$ is associated with the blue channel contribution to the color-corrected red channel value. Similarly, $k_{gr}$, $k_{gg}$, and $k_{gb}$ are the coefficients associated with the red, green, and blue channel contributions to the color-corrected green channel value, respectively, and $k_{br}$, $k_{bg}$, and $k_{bb}$ are the coefficients associated with the red, green, and blue channel contributions to the color-corrected blue channel value, respectively.

Experimental measurements of the output of the display device relative to reference colors in a reference color chart can be used to experimentally determine the desired coefficients. Moreover, a different set of coefficients may be solved for each of a plurality of different backlight settings for the device during the calibration process. This way, a different color correction matrix may be defined for each of a plurality of different backlight settings for the device (although some settings may apply the same matrix if the same adjustments are adequate for both backlight settings). The matrices can be stored in memory 104 and applied by processor 102 on a backlight setting-basis.

In some examples, however, some backlight displays, such as LCD displays, can exhibit a significant color crosstalk between their RGB channels. Moreover, OLED display, and other types of displays that implement different luminance levels may have similar issues. As a result, a larger color correction coefficient matrix (i.e., larger than 3 by 3) may provide better average error results by providing better compensation for the panel RGB-color crosstalk, and as a result providing better levels of color error. Using a larger matrix and therefore, a polynomial regression with $2^{nd}$ and $3^{rd}$ orders of RGB terms, provides compensation for mismatch with the RGB matching functions, mismatch with a target D65 white point, and color crosstalk between the RGB channels. In one example, a 3 by 11 color correction matrix may include polynomial coefficients $a_{i1}$ corresponding to the R channel that provides the following color-corrected red band polynomial $R_{cie}$:

$$R_{cie}=a_{01}+a_{11}R_d+a_{21}G_d+a_{31}B_d+a_{41}R_dG_d+a_{51}G_dB_d+\\a_{61}B_dR_d+a_{71}R^2_d+a_{81}G^2_d+a_{91}B^2_d+a_{101}R_dG_dB_d$$

Similar polynomials may be used for the green and blue bands with the corresponding coefficients to provide the color-corrected green and blue values, $G_{cie}$ and $B_{cie}$:

$$G_{cie}=a_{02}+a_{12}R_d+a_{22}G_d+a_{32}B_d+a_{42}R_dG_d+a_{52}G_dB_d+\\a_{62}B_dR_d+a_{72}R^2_d+a_{82}G^2_d+a_{92}B^2_d+a_{102}R_dG_dB_d$$

$$B_{cie}=a_{03}+a_{13}R_d+a_{23}G_d+a_{33}B_d+a_{43}R_dG_d+a_{53}G_dB_d+\\a_{63}B_dR_d+a_{73}R^2_d+a_{83}G^2_d+a_{93}B^2_d+a_{103}R_dG_dB_d$$

The coefficients $a_{01}$, $a_{02}$, and $a_{03}$ represent the black offset associated with each of the red, green, and blue channels, respectively. The black offset value can adjust for black light leakage. Black light leakage is the amount of luminance observed on a display when the input is zero for each of the R, G, and B channels. Theoretically, the luminance is expected to be zero, e.g., the constant terms in the equations above should be zero for zero input channels. However, most displays cannot display absolute black, and as a result, for zero R, G, B inputs, non-zero luminance is observed, and that non-zero value is offset by the constant coefficients $a_{01}$, $a_{02}$, and $a_{03}$. Empirical tests may be performed as part of the calibration process to generate the coefficients of the equations above for any given display (or class of displays).

The coefficients $a_{1x}$, $a_{2x}$, and $a_{3x}$, where x=1, 2, or 3, represent the coefficients associated with the one-channel contributions, or, the contribution of each of the red (R), green (G), and blue (B) channels alone. The coefficients $a_{4x}$, $a_{5x}$, and $a_{6x}$, where x=1, 2, or 3, represent the coefficients associated with two-channel contribution, which represents crosstalk between red and green, red and blue, and green and blue. In one example, when there is not crosstalk between two channels, then the corresponding coefficient is equal to 0. The coefficients $a_{7x}$, $a_{8x}$, and $a_{9x}$, where x=1, 2, or 3, represent the coefficients associated with the second order contribution of each of the red, green, and blue channels. The coefficients $a_{101}$, $a_{102}$, and $a_{103}$ represent the crosstalk among the three different channels.

In particular, $a_{01}$, $a_{02}$, and $a_{03}$ represent the black offset associated with each of the red, green, and blue channels, respectively. $a_{11}$, $a_{21}$, and $a_{31}$ are the coefficients associated with the red, green, and blue channel contributions to the color-corrected red channel value, respectively; $a_{12}$, $a_{22}$, and $a_{32}$ are the coefficients associated with the red, green, and blue channel contributions to the color-corrected green channel value, respectively; and $a_{13}$, $a_{23}$, and $a_{33}$ are the coefficients associated with the red, green, and blue channel contributions to the color-corrected blue channel value, respectively. $a_{41}$, $a_{42}$, and $a_{43}$ are the coefficients associated with the red and green channel crosstalk contributions to the color-corrected red, green, and blue channel values, respectively; $a_{51}$, $a_{52}$, and $a_{53}$ are the coefficients associated with the blue and green channel crosstalk contributions to the color-corrected red, green, and blue channel values, respectively; and $a_{61}$, $a_{62}$, and $a_{63}$ are the coefficients associated with the red and blue channel crosstalk contributions to the color-corrected red, green, and blue channel values, respectively. $a_{71}$, $a_{81}$, and $a_{91}$ are the coefficients associated with the second order red, green, and blue channel contributions to the color-corrected red channel value, respectively; $a_{72}$, $a_{82}$, and $a_{92}$ are the coefficients associated with the second order red, green, and blue channel contributions to the color-corrected green channel value, respectively; and $a_{73}$, $a_{83}$, and $a_{93}$ are the coefficients associated with the second order red, green, and blue channel contributions to the color-corrected blue channel value, respectively. $a_{101}$, $a_{102}$, and $a_{103}$ are the coefficients associated with the red, green, and blue channel crosstalk contribution to the color-corrected red, green, and blue channel values, respectively.

These additional 3 by 11 equations shown above, may represent a 3 by 11 matrix that can be solved during color calibration and then applied (based on the solved values for coefficients a) for color adjustment during operation of the display device. As with the 3 by 4 example discussed above, experimental measurements of the output of the display device relative to reference colors in a reference color chart can be used to experimentally determine the desired coefficients for the 3 by 11 matrix. Moreover, a different set of coefficients may be determined for each of a plurality of different backlight settings for the device. This way, a different color correction matrix may be defined for each of a plurality of different backlight settings for the device (although some settings may apply the same matrix if the same adjustments are adequate for both backlight settings). Once the coefficients are defined for each set of polynomial equations of the matrix, the matrix can be applied during operation of the device to make adjustments for the red, green and blue channels. In particular, the matrices can be stored in memory 104 and applied by processor 102 on a backlight setting basis. Again, these adjustments may adjust for color response differences (i.e., chrominance shifts) at different backlight settings, and color inaccuracies due to color channel cross-talk in the different backlight settings.

During calibration, the appropriate value of N, that determines the size of the color correction matrix, may be determined by determining the average color error for all input reference colors, and selecting the coefficient matrix that provides the smallest average color error. TABLE 4 below shows example average color error for outputs using coefficient matrices ranging in size from 3 by 3 to 3 by 11:

TABLE 4

| CC Matrix Size | Color Error | | |
|---|---|---|---|
| | Average | Max | Saturation |
| Reference | 0.743 | 2.33 | 98.12 |
| Without CC | 6.84 | 13.9 | 101.80% |
| 3 × 3 | 3.57 | 13.2 | 106.60% |
| 3 × 4 | 2.44 | 5.84 | 101.20% |
| 3 × 5 | 1.79 | 7.76 | 100.50% |
| 3 × 7 | 1.64 | 8.75 | 99.70% |
| 3 × 8 | 1.53 | 5.37 | 99.42% |
| 3 × 10 | 1.55 | 8.46 | 99.83% |
| 3 × 11 | 1.55 | 5.69 | 99.61% |

In the example illustrated by TABLE 4 above, the 3 by 8 (i.e., 3×8) coefficient matrix yields the smallest average color error and may, therefore, be selected for purposes of color correction. As the example of TABLE 4 above shows, color correction matrices with sizes larger than 3 by 8, also provide relatively small average color error values. In one example, when the average color error values are relatively close for different size matrices, the smaller size matrix may be selected. The determined color correction matrices associated with a display of a device may be stored in a memory of the device, e.g., memory 104. For this example of the 3 by 8 matrix, TABLE 5 below shows the corresponding 3 by 8 coefficient matrix:

TABLE 5

| CH | a1 | a2 | a3 | a4 | a5 | a6 | a7 | a8 |
|---|---|---|---|---|---|---|---|---|
| R | 1.059390335 | −0.108926127 | 0.108333999 | 0.000093159 | 0.000436932 | −0.000082718 | −0.000001381 | 10.030696766 |
| G | −0.058789574 | 1.217153904 | −0.206432955 | 0.000376426 | −0.000123559 | 0.000382131 | −0.000003247 | 2.731068318 |
| B | −0.005893773 | 0.078527530 | 0.851843600 | −0.000651521 | −0.000076928 | 0.000452041 | 0.000002371 | 6.717279256 |

Verification of the characterization and calibration of the color response of a display panel may be then performed by inputting the reference colors (e.g., the colors of the Macbeth chart), applying the appropriate color correction matrix determine during the characterization and calibration process, and the matching gamma correction using the MGCLUT, and measuring the corresponding color outputs.

Figure 6B:
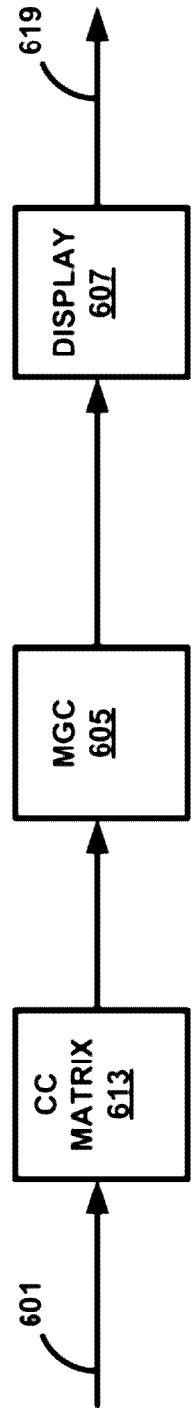
FIG. 6B is a block diagram illustrating an exemplary system for verification of a color-response calibrated display.

FIG. 6B illustrates an example system for verification of color response of a display. Verification of the color correction of the color response of a display may be performed by using input 601, which may comprise reference linear color data/values (e.g., corresponding to linear color values of the Macbeth colors). Input 601 may be processed by a processor (e.g., processor 102 of FIG. 1) that applies the color correction coefficient matrix 613 determined through the calibration process, described above with reference to FIG. 6A. In one example, the color correction coefficient matrix may be stored in a memory, e.g., memory 104. The processor also applies the previously-obtained matching gamma correction (MGC) 605, which may be stored as a lookup table (e.g., MGCLUT 114) in the memory, e.g., memory 104.

The processed color-corrected input colors are then sent to display 607. A color measuring device may obtain color measurement of the displayed colors for each color and output as measured color corrected reference color outputs 619. The color error for the color-corrected output may then be determined to ensure that the results match the expected color error determined during calibration. TABLE 6 below shows an example of comparison between the calibration and verification results of the color response of a display in terms of the average and maximum color errors for the 24 colors in the Macbeth color chart. In this example, a 3 by 8 matrix is used for color correction:

TABLE 6

| Stage | CC Matrix Size | Color Error Average | Max | Saturation |
|---|---|---|---|---|
| Reference | Reference | 0.743 | 2.33 | 98.12 |
| Without CC | Without CC | 6.84 | 13.9 | 101.80% |
| Calibration | 3 × 8 | 1.53 | 5.37 | 99.42% |
| Verification | 3 × 8 | 1.56 | 5.45 | 101.00% |

The display color response characterization and calibration may be initially performed at 100% backlight. Once calibration is achieved at 100% backlight, the panel backlight may be reduced, until the color error is above 2 delta e (CIE), i.e., until the color difference is noticeable to the average human eye. For some displays, an error above 2 delta e (CIE) may occur at 80% backlight; for other displays, it may occur at 75%, and so forth. As a result, performing the characterization and calibration at the manufacturing stage ensures that the color correction is accurate and adapted to the characteristics of the display.

When the color error goes above 2 delta e (CIE), the process of calibration, as described above, may be repeated to obtain the appropriate matrix of coefficients for that backlight level. Once the color correction coefficient matrix is obtained for one backlight level or one backlight level range, the panel backlight is reduced again until the color error is above 2 delta e (CIE), and calibration is performed to obtain the next set of color correction coefficients. The process may be repeated for multiple backlight levels or ranges down to the lowest desired backlight level. In one example, 20% backlight level may be the lowest, beyond which color correction may not be performed. The lowest backlight level may vary from one system or device to another.

In some examples, calibration may be performed at several different backlight levels regardless of the color error, such as by providing calibration at fixed backlight levels regardless of color error. In still others examples, the condition for using a new color correction matrix may occur if the average error for 24 (or any other number of) reference colors is increased by more than 1 CIE DE2000 (where DE is a known standard error metric established in the year 2000). This use of an average for 24 (or any other number of) reference colors may be applied to any of the forgoing examples that discuss color error going above 2 delta e (CIE).

Data representing the matrices of the color correction coefficients may be stored in memory (e.g., memory 104 of FIG. 1) and associated with the corresponding backlight levels or backlight level ranges. Hence, each backlight level may have an associated color correction matrix that has been formulated for the color response of the display at the given backlight level. Each of the backlight levels may correspond to a range of backlight levels. For example, a first matrix may correspond to a backlight reduction level of 80% of the normal backlight level, and a second matrix may correspond to a backlight reduction level of 60% of the normal backlight level. Therefore, for a backlight reduction level of 65% of the normal backlight level, panel color correction may utilize the first matrix, e.g., the matrix corresponding to the 80% backlight reduction. In this example, the backlight reduction may be rounded up to the next backlight reduction level. In another example, a backlight reduction level of 65% of the normal backlight level, PCC may utilize the second matrix, e.g., the matrix corresponding to the 60% backlight reduction. In this example, the backlight reduction may be rounded to the nearest cutoff backlight reduction level.

In one aspect of this disclosure, by performing display characterization and calibration, different matrices can be obtained for different backlight reduction levels, as described above. The coefficient matrices may be stored in a memory, e.g., memory 104 of FIG. 1, and utilized in panel color correction, which may be preformed or controlled by processor 102 to control display 106. For example, during operation of device 100, the backlight level of display 106 may change from a backlight level associated with one color correction matrix to a new backlight level associated with another color correction matrix. Processor 102 may retrieve from memory 104, the color correction matrix associated with the new backlight level from color correction matrices 116, and use color correction unit 112 to apply the retrieved color correction matrix to image data sent to display 106. Processor 102 may then send the color-corrected image to display 106, which may display the color-corrected image at the new backlight level.

Figure 7:
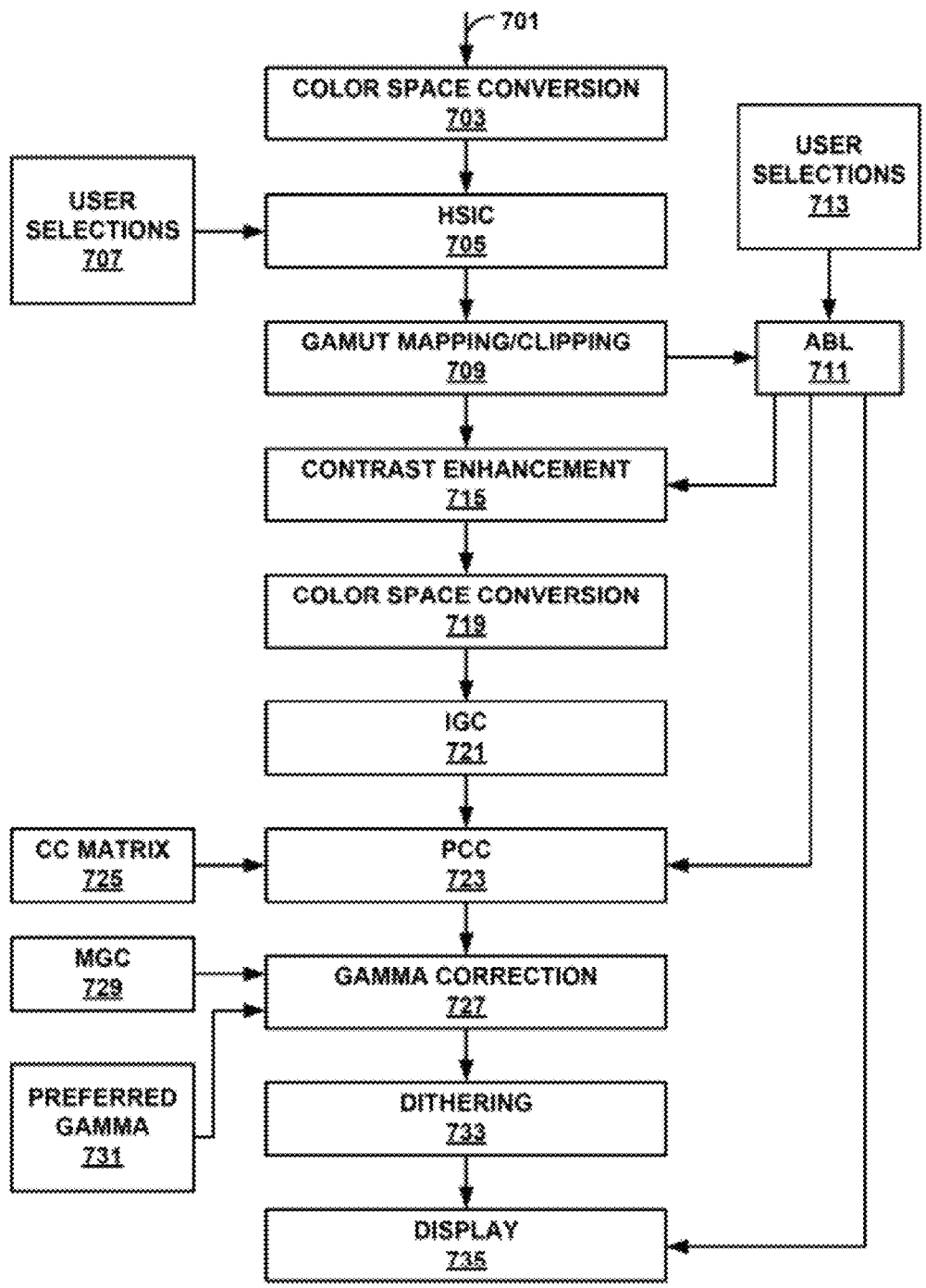
FIG. 7 is a block diagram of an exemplary color correction module, which may form part of the processor of FIG. 1.

FIG. 7 illustrates a block diagram of a color correction module, which may form part of processor 102 of FIG. 1. The color correction module of FIG. 7 may be implemented by device 100, for example. In general, the color correction module may provide two functions: compensating for factors that affect display color accuracy [including mismatch with the RGB matching functions (FIGS. 2A and 2C), mismatch with the target D65 white point (FIGS. 2B and 2D), and color cross talk between RGB channels], and compensating for spectral shift that occurs due to backlight modulation. The display characterization and calibration (DCC) process as described above, and performed at different backlight levels accommodates the color discrepancies and spectral shift that occurs due to backlight modulation and produces color correction matrices that define coefficients for color correction at the different backlight levels. In some examples, for a specific LCD panel, there may be three significant spectral shifts corresponding to reduced backlight levels that cause color error larger than 2 delta e (CIE). In other examples, there may be more or less significant spectral shifts. The appropriate number of PCC matrices, based on the behavior of the display at different backlight levels, may be generated, as discussed above, and stored in memory.

Input image 701 may have color characteristics described in a color space associated with the image, e.g., standard RGB color space. In some examples, a color space conversion unit 703 may convert the image to another color space, e.g., from sRGB to HSV, which expresses image data in hue, saturation, and value (or brightness). Conversion to HSV, for example, allows for HSIC (hue, saturation, intensity, contrast) adjustments in response to user selections 707. HSIC unit 705 may adjust hue, saturation, intensity, and contrast of the incoming image, in response to user selections 707. Additionally, there may be an adjustment to the backlight level of the display panel, e.g., a reduction in backlight level to reduce power consumption. The backlight level adjustment may be done automatically or in response to user selection 713. Adjustment of the backlight level of the display may be expressed as a percentage relative to a default backlight level or the maximum (100%) backlight level, e.g., a reduction from 100% to 75%, or from 75% to 50%, and so forth. In one example, the reduction of the backlight level may be relative to the previous backlight level.

Gamut mapping/clipping unit 709 may generate a histogram distribution of the content of the image, which may provide a representation of the tonal distribution of the image. Gamut mapping unit 709 may provide the image histogram to the adaptive backlight (ABL) unit 711. The ABL unit 711 may utilize the image content information (e.g., a histogram of values of the incoming image) to establish how to adjust the backlight level, e.g., how much to adjust the backlight level (from 100% to 60%, for example). ABL unit 711 may then send a signal to display 735 with the backlight level adjustment to adjust the backlight level of the display panel. Additionally, ABL unit 711 may generate a contrast enhancement lookup table (LUT_V) and send the lookup table to contrast enhancement unit 715, which utilizes the contrast lookup table to adjust the contrast in the image. The contrast enhancement is therefore applied to the image content in the HSV color space. ABL unit 711 may generate the contrast enhancement lookup table based on the incoming image to boost up the brightness of the image in the context of the adjusted backlight level.

Once the contrast has been enhanced according to the lookup table from ABL unit 711, the image may be converted back from the "hue, saturation, brightness" (HSV) space to the standard RGB (sRGB) color space (as most displays accept RGB values) in color space conversion unit 719. Standard IGC (inverse gamma correction) expansion unit 721 may expand color information from 8 bits to 12 bits, for example. IGC transforms the image content from the nonlinear sRGB color space to a linear RGB color space, as the linear color space ensures more accurate color correction, because color characterization is performed using linear color space. IGC unit 721 also performs the 8-bit to 12-bit expansion for additional accuracy, as subsequent color correction and gamma correction operate with 12-bit data.

Panel color correction unit (PCC) 723 may then utilize the information provided from ABL unit 711 regarding the adjusted backlight level to retrieve from memory the corresponding matrix of response calibration data or color correction matrix 725 (e.g., a color correction matrix of coefficients) associated with the backlight level of the display panel, and apply the color correction set to the display image data to generate color corrected image data for red, blue, and green (R, G and B) bands. PCC unit 723 ensures that color accuracy of the image content remains intact due to the spectral shift of the adjusted backlight level. Color correction is applied to the image content after conversion back to the RGB color space, therefore, obtaining new R, G, and B values that also account for cross-talk between the input RGB channels. Brightness of the image content may be also lost due to the adjusted backlight level, which is boosted by applying the appropriate contrast enhancement in contrast enhancement unit 715.

Referring back to PCC unit 723, for example, in response to backlight level adjustment of the display of the device from 100% to 75%, the processor retrieves polynomial coefficients as defined by the color correction matrix, corresponding to the adjusted backlight level, for each of the color bands from memory, e.g., from a look up table or other data structure in the memory, and applies the coefficients to the display RGB values $R_d G_d B_d$ to generate color-corrected R, G, B band values $R_{cie} G_{cie} B_{cie}$. For example, for a specific LCD panel, there may be 3 significant spectral shifts corresponding to reduced backlight levels of 70%, 45% and 25%. During DCC, as described above, 3 sets of 3 by N (e.g., N is determined based on experimental results during DCC of the display panel) color correction matrices may be generated and stored in memory. Upon receiving a changed backlight level from ABL unit 711, PCC unit 723 retrieves the corresponding 3 by N matrix and applies it to the input 12-bit linear RGB image data to obtain the color corrected RGB values.

Gamma correction unit 727 may then apply to the color-corrected image the matching gamma correction (MGC) data 729 associated with the display panel using the MGCLUT, as described above, which was generated during tone response characterization and calibration. The gamma correction may be applied to each of the R, G, and B channels, as the matching gamma correction values are obtained for each of the R, G, and B channels. The matching gamma correction data obtained during the tone response characterization and calibration may be based on a standard gamma value (e.g., REC-709 gamma) However, the user may want to adjust display gamma to another value, which may be combined with the matching gamma correction. Gamma correction unit 727 may also receive a preferred gamma value 731 corresponding to user selection and incorporate the user-selected gamma into the gamma correction of the color-corrected image data. The color- and gamma-corrected image data may then go through dithering unit 733. Dithering may be useful when a display has lower RGB bit resolutions than the image to be displayed. For example, during processing, the produced image may have 24 bit resolution (8 bits per color). However, most displays for mobile devices are 18 bit displays (6 bits per color). Dithering may be applied to prevent artifacts in the displayed images that may result in the difference between the two resolutions.

The primary display 735 (e.g., display 106 of FIG. 1) then receives the color- and gamma-corrected image data, and the backlight adjustment information from ABL unit 711, and the display is adjusted accordingly, resulting in an adjustment to the backlight level, e.g., reduction in backlight, and an adjustment to the image data corresponding to the appropriate color-corrected image such that the color accuracy of the displayed image is maintained relative to a default backlight level (e.g., 100% backlight level) despite the backlight level adjustment.

In one aspect of this disclosure, the appropriate color correction matrix may provide coefficients that correspond to a polynomial model for each of the color bands. Polynomial model with RG, RB, GB, and RGB terms may provide compensation for the significant color crosstalk between the RGB channels in some displays, such as LCD displays. Reducing the crosstalk may improve the color response of the display over more traditional approaches. In some example, some displays may not exhibit significant crosstalk between the RGB channels (e.g., IPS LCD panels), and during calibration, it may be determined that a 3 by 3 regression may provide appropriate color correction results.

In an example, an LCD may be characterized and calibrated for both RGB tone and color responses while the backlight level is set to 100%. TABLE 7 below shows an example, where 10 coefficients for polynomial model are obtained for each color band. In some examples as shown below, the constant term may not be necessary if the black offset due to light leakage is first applied to the measured data.

TABLE 7

| Poly Coeffs | Poly Term | R | G | B |
| --- | --- | --- | --- | --- |
| $a_1$ | R | 1.2270010306 | −0.0204241516 | 0.0506285262 |
| $a_2$ | G | −0.1226159045 | 1.0322912561 | 0.1145764728 |
| $a_3$ | B | 0.1964419211 | 0.0448817872 | 0.9577129981 |
| $a_4$ | RG | 0.0006813354 | −0.0004968036 | −0.0005057897 |
| $a_5$ | GB | −0.0000187667 | −0.0004814494 | −0.0011837953 |
| $a_6$ | BR | −0.0007218503 | 0.0001029031 | −0.0006680118 |
| $a_7$ | RR | −0.0009982765 | 0.0003222972 | −0.0000352318 |
| $a_8$ | GG | 0.0003215401 | 0.0003160944 | −0.0001864922 |
| $a_9$ | BB | −0.0014857548 | −0.0003990746 | −0.0000548496 |
| $a_{10}$ | RG B | 0.0000038713 | 0.0000016095 | 0.0000084745 |

TABLE 8 below shows the average and maximum color error for the 24 colors of the Macbeth color checker chart using the example coefficient shown above in TABLE 7:

TABLE 8

| | | | Uncorr. Color Error | | CIEDE2000 | |
| --- | --- | --- | --- | --- | --- | --- |
| #coeffs | Saturation | Gamma | Mean | Max | Mean | Max |
| 10 | 99.35% | 1/2.15 | 1.43 | 8.49 | 1.61 | 8.53 |

Figure 8:
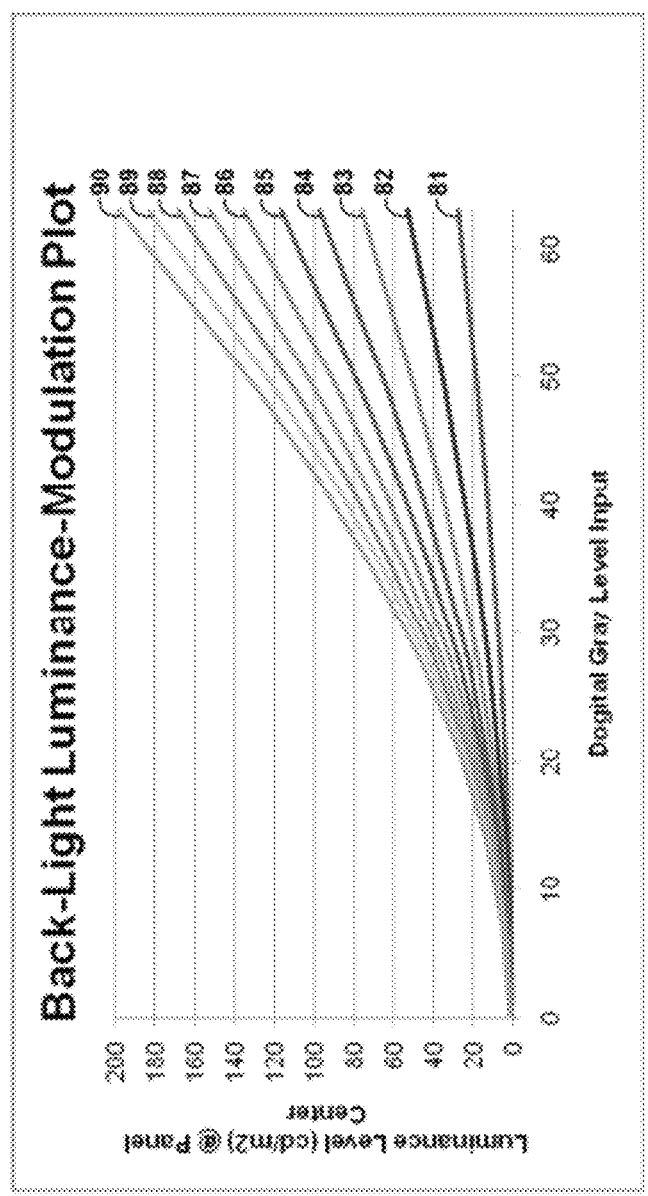
FIG. 8 is a graph illustrating different backlight characterization plots for a display at different backlight levels.

In some examples, backlight characterization may also be utilized to determine the luminance response of a display at different backlight levels. This information may be utilized to calculate and define the contrast enhancement lookup tables (LUT_V), which may be used to boost the brightness of an image based on the backlight level. FIG. 8 illustrates an example backlight characterization plot for a display for different backlight levels.

In FIG. 8, reference number 81 corresponds to a backlight level of 10%. Reference number 82 corresponds to a backlight level of 20%. Reference number 83 corresponds to a backlight level of 30%. Reference number 84 corresponds to a backlight level of 40%. Reference number 85 corresponds to a backlight level of 50%. Reference number 86 corresponds to a backlight level of 60%. Reference number 87 corresponds to a backlight level of 70%. Reference number 88 corresponds to a backlight level of 80%. Reference number 89 corresponds to a backlight level of 90%. Reference number 90 corresponds to a backlight level of 100%. At each backlight level, the luminance level is determined and plotted for different gray level inputs. Contrast enhancement LUT (LUT-V) may be generated based on the histogram of the incoming image (Histo_V) and backlight luminance-modulation curves.

Figure 9:
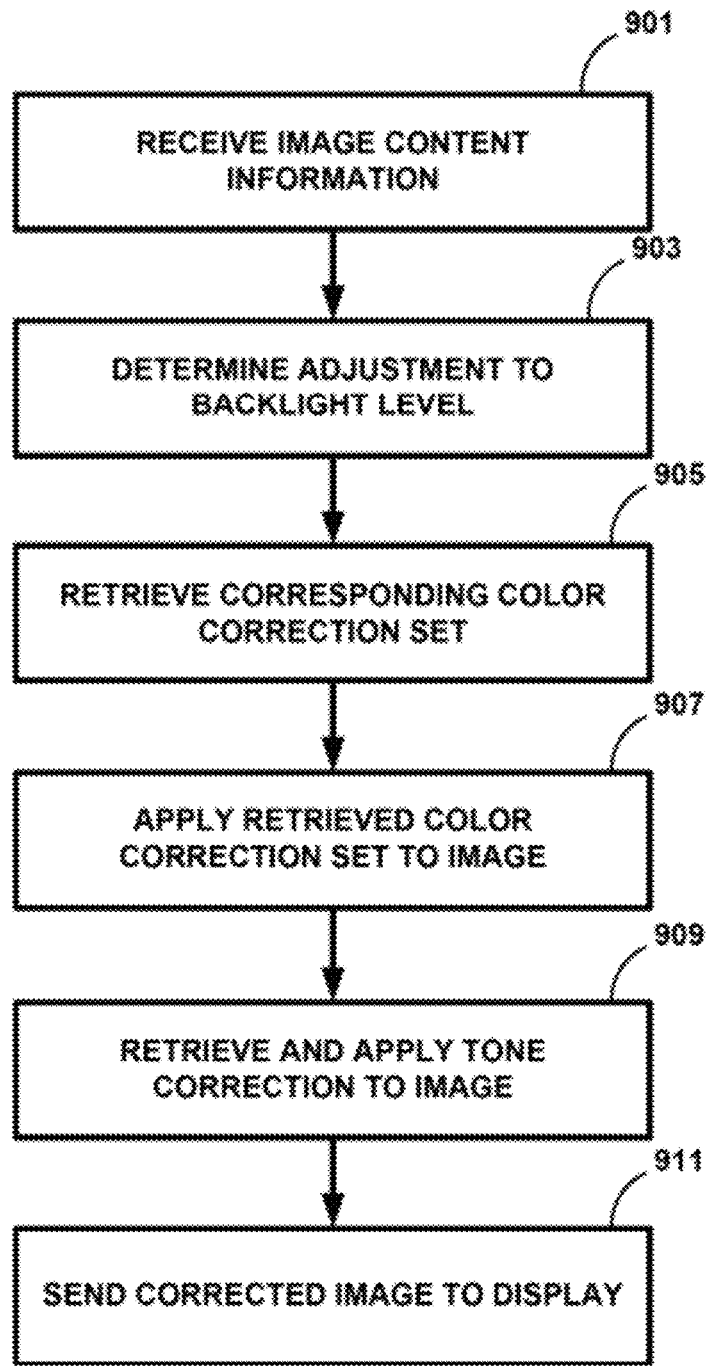
FIG. 9 is a flow diagram illustrating an exemplary process for adjusting the color output of a display device consistent with this disclosure.

FIG. 9 is a flow chart illustrating an example process in accordance with techniques of this disclosure. A processor (processor 102 of FIG. 1) may receive image content information (901). Processor 102 may also determine an appropriate adjustment to the backlight level of an associated display (903), which may be based on an automatic backlight level adjustment (e.g., due to inactivity of the device) or user adjustment (e.g., selection of a lower display brightness level). Based on the adjustment to the backlight level, e.g., 75% backlight level, processor 102 may retrieve a corresponding color correction matrix (905) (e.g., selected from color correction matrices 116 in memory 104 of FIG. 1). As noted above, the color correction matrices may be generated during a DCC process for different backlight levels or ranges. Processor 102 may then apply the retrieved color correction matrix to the image color data representing the image content (907). Processor 102 may also retrieve tone correction information (e.g., tone correction LUT 114 from memory 104) associated with the display and apply the tone correction to the image data (909). Processor 102 may then send the adjusted backlight level and the image with corrected color and tone responses to a display device (e.g., display 106) (911), such that the accuracy of the color response of the image is maintained regardless of the backlight level adjustment. Processor 102 may also generate contrast enhancement data to adjust the brightness of the image based on the adjusted backlight level.

In another example, to identify and generate tone adjustments, inputs can be applied to the device for each channel (e.g., each R, G and B channel), and the outputs of the device can be measured as described herein. In this example, a lookup table can be generated that includes adjustments for each of the R, G and B channels for each intensity values (e.g., intensity values from 0 to 255). Tone adjustments may be applied to a device for each color channel based on the lookup table.

Referring again to FIGS. 4B-4D may be viewed as illustrating tone adjustment curves (i.e., curves 411, 413 and 415), which are also shown in FIG. 4E. These graphs illustrate one way to identify and generate tone adjustments. In this case, for each channel (e.g., for R, G and B channels), input values (e.g., along the X axis of FIGS. 4B-4D) can be mapped to adjusted output values according to tone adjustment curves 411, 413 and 415. The desired tone response is illustrated as the linear dotted lines (i.e., desired tone response curves 431,433 and 435) in each respective graph. The actual tone response is illustrated as the dashed lines (i.e., the actual response curves 421, 423 and 425) in each respective graph, and the luminance outputs needed to modify the actual tone response to the desired tone response are represented by curves 411, 413 and 415. As can be seen, the adjustment curves 411, 413 and 415 generally mirror the actual response curves 421, 423 and 425 about the desired tone response curves 431,433 and 435. Accordingly, by applying adjustment values sufficient to change the expected response from that of the actual response curves 421, 423 and 425 to that of adjustment curves 411, 413 and 415, the desired tone response curves 431,433 and 435 can be achieved.

TABLE 2 above represents an exemplary lookup table (LUT) that may be used to map inputs to outputs for every channel (e.g., for each of Red, Green and Blue channels) consistent with this disclosure. The lookups, in one example, may comprise one-dimensional adjustments for each color channel at different intensity levels. TABLE 2 (or the like) may be generated during calibration, stored in memory 104, and applied by processor 102 as a linear step for addressing tone response for improved color output.

In addition to adjusting for tone response, the techniques of this disclosure also adjust for color response using color correction matrices, as described above. In one example, the tone response may be applied for all backlight settings, while the color response adjustments may adjust for color response at different backlight settings. In addition, the adjustments to color response may adjust for color inaccuracies due to problems associated with color cross-talk. As explained above, cross-talk refers to changes in color response in one of the R, G and B channels due to the presence of signals in other R, G, or B channels. Inaccuracies associated with channel crosstalk may be more evident in gray tracking, where channel crosstalk that is not accounted for in generating the color correction matrices results in gray being displayed incorrectly. For example, channel crosstalk may result in the grays having a tint of the color channel or channels that exhibit crosstalk (e.g., grays may have a blue, green, and/or red tint).

To adjust for color response during calibration, inputs may be applied at different gray scales, where gray scale refers to situations where each of the R, G and B channels are the same. The calibration techniques of this disclosure may solve for variables of a color correction matrix that may be applied for R, G and B channels. The color correction matrix may comprise a matrix based on a linear or polynomial model (e.g., a 3 by 4 matrix or larger), as outlined above, and the matrix (or matrices) may be stored in memory 104 and applied by processor 102 to improve color output by display 106. In one example, the color correction matrix may comprise a larger matrix (e.g., a 3 by 11 matrix) based on a polynomial model. The matrix may be applied during operation of the device for color correction and may address color channel crosstalk that may otherwise impact colors in grayscale. The inputs to the 3 by 11 matrix may comprise R, G and B values and the outputs may comprise new adjusted values for R, G and B, as shown above. The techniques of this disclosure may apply color correction matrices for a three-channel display (such as with R, G and B output), wherein the matrices comprise 3 by N matrices and N is an integer greater than 3.

According to this disclosure and as discussed above, different color correction matrices may be generated and applied for different backlight levels, and this may occur after the adjustments for tone response. During calibration, a number of different color correction matrices may be determined for the different backlight levels. In some cases, two similar backlight levels may sometimes use the same color correction matrix. However, according to this disclosure, some or all of the different backlight levels may be configured to apply different color correction matrices. According to this disclosure, processor 102 may be configured to apply different color correction matrices for at least two different backlight levels of display 106 in order to address color response of display 106. Thus, processor 102 may apply a lookup table to achieve one-dimensional tone response adjustments for each color channel at different intensity levels, and may also apply different color correction matrices for at least two different backlight levels of display 106 in order to address color response of display 106.

Figure 10:
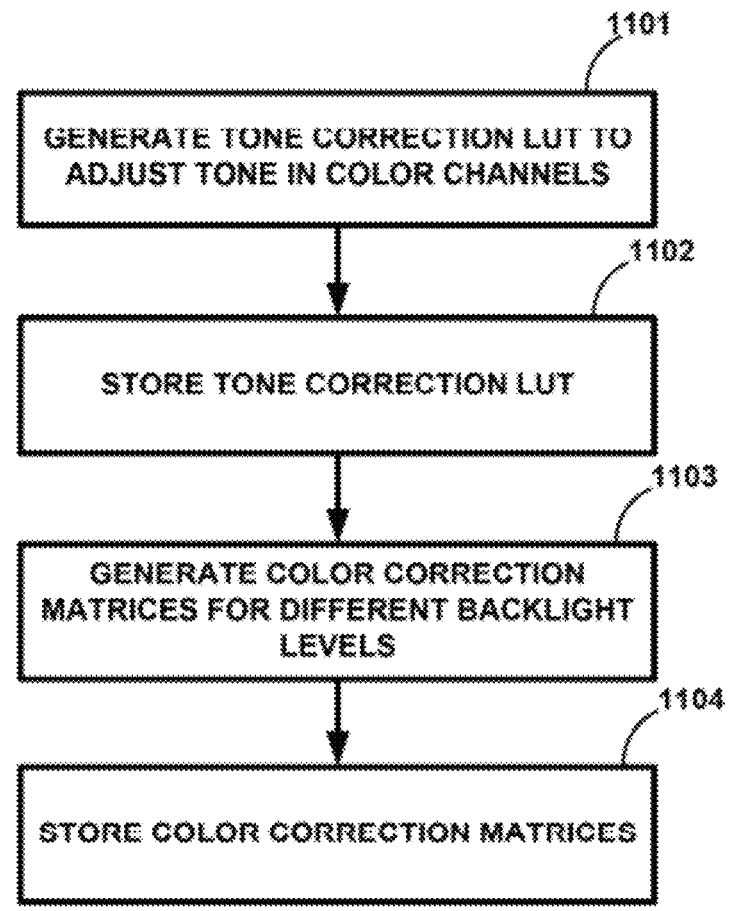
FIG. 10 is a flow diagram illustrating a calibration process that may be performed to generate tone correction LUT and chromaticity correction matrices for a backlight display device.

FIG. 10 is a flow diagram illustrating a calibration process that may be performed (e.g., by a device manufacture or device seller) in order to generate tone correction LUT 114 and color correction matrices 116 for device 100 of FIG. 1. The calibration process may include generating a lookup table to adjust tone response in each of red, green and blue channels of the backlight display device 100 (1101). The generated lookup table may then be stored in memory 104 of backlight display device 100 (1102), e.g., as tone correction LUT 114.

The calibration process may also include generating coefficients of two or more different color correction matrices at two or more different backlight settings of backlight display device 106, such as for two or more of the different backlight settings (e.g., backlight levels) illustrated in FIG. 8. The coefficients may adjust for cross-talk between the red, green and blue channels of backlight display 106 at the two or more different backlight settings. As part of the calibration process, the lookup table and the coefficients of the two or more different color correction matrices may be stored in memory 104 of backlight display device 104 (e.g., as tone correction LUT 114 and color correction matrices 116 for application in rendering color by backlight display 106 of device 100.

Figure 11:
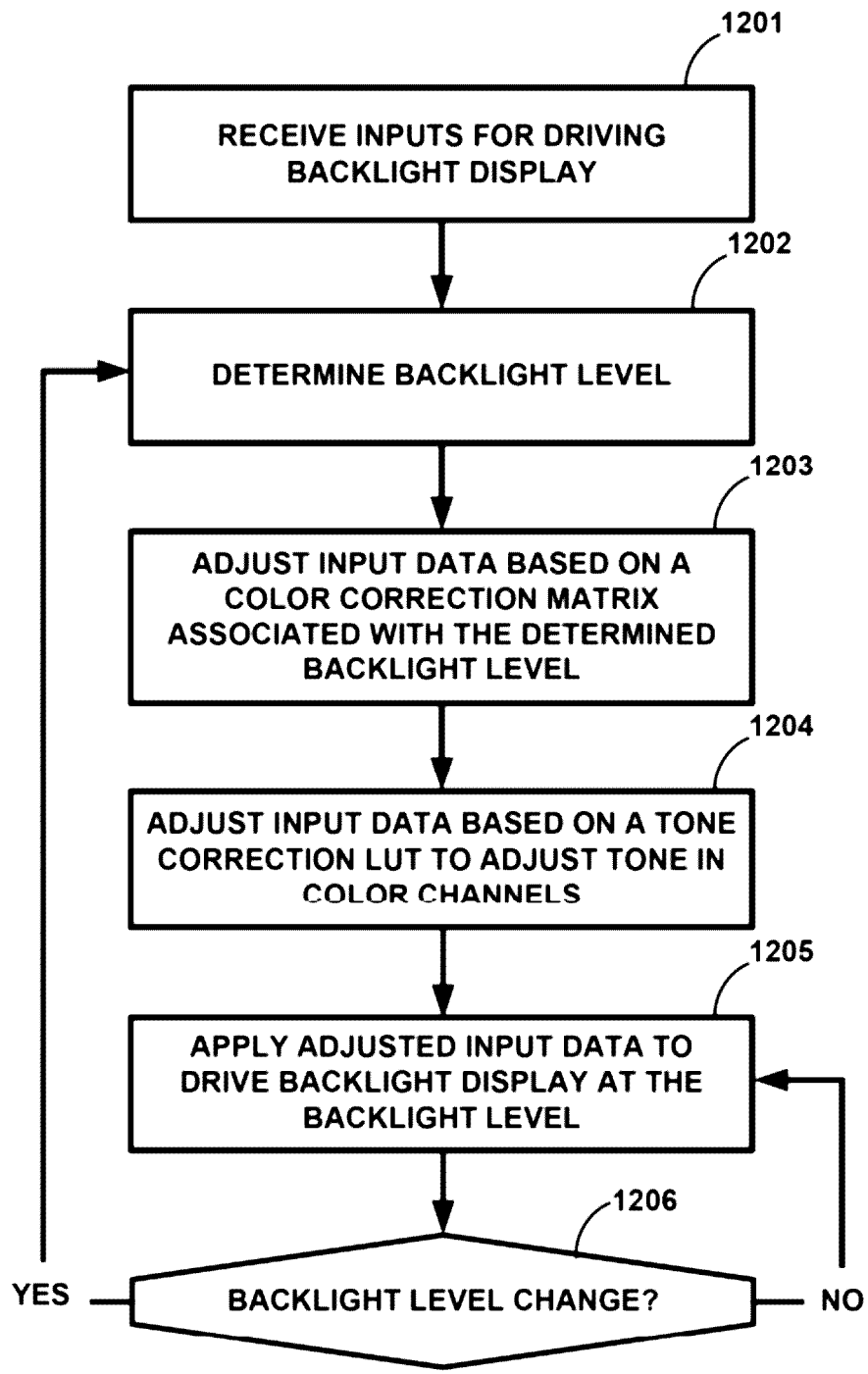
FIG. 11 is a flow diagram illustrating an exemplary process that may be implemented by a backlight display device to facilitate color correction of input data to backlight display.

FIG. 11 is a flow diagram illustrating an exemplary process that may be implemented by backlight display device 100 to facilitate color correction of input data to backlight display 106. As shown in FIG. 11, processor 102 receives inputs for driving backlight display 106 (1201), such as from memory 104 or from another source such as a video graphics processor (not shown), a video decoder (not shown), another device (not shown) or any other source.

Backlight selection unit 110 may select or otherwise determine the current backlight level of backlight display 106 (1202), such as 100%, 90%, 80%, 75%, 50%, or any fixed backlight level. The backlight levels may be predefined by operation of backlight display device 106 so as to allow for reductions in backlight to save power. For example, backlight display 106 may reduce its backlight level in discrete steps over time to reduce power consumption. If a user actuates a button or otherwise interacts with device 100, the backlight may increase back to 100% and then reduce over time.

After backlight selection unit 110 determines the backlight level of backlight display 106 (1202), color correction unit 112 may adjust the input data based on color correction matrices 116 stored in memory 104. In particular, different color correction matrices 116 may be defined for different backlight levels, and color correction unit 112 may adjust the input data based on a particular color correction matrix that is associated with the determined backlight level (1203). Processor 102 may also adjust the inputs data based on tone correction LUT 114 stored in memory 104 (1204). Processor 102 may then apply the adjusted inputs to drive backlight display 106 at the current backlight level (1205). These corrections may remain static until the backlight level changes ("yes" 1206). In particular, when the backlight level changes ("yes" 1206), backlight selection unit 110 may determine the new backlight level of backlight display 106 (1202), and color correction unit 112 may adjust the input data based on a particular color correction matrix that is associated with the new determined backlight level (1203). In some examples, this may involve the application of a different matrix than the previous matrix used for the previous backlight level. Processor 102 may then apply the adjusted inputs to drive backlight display 106 at the current backlight level (1205). Steps 1203-1206 may repeat anytime the backlight level changes. In some examples, if new input data is received (e.g., associated with a different source or different video sequence), the entire process of FIG. 11 may begin anew.

The techniques of this disclosure may address two distinct problems. In one example, the techniques may address problems due to changing luminance levels of a display, which can lead to a significant change in color characteristics of a display panel. The techniques described above, on this issue, focus primarily on backlight displays, such as LCD panels, but the techniques may be likewise applicable to other displays that have changing luminance levels, including OLED display panels. In case of LCD panels, changing luminance may occur when the luminance of the backlight source is reduced or increased. In case of OLED panels (which do not have a separate backlight source) changing luminance when the panel luminance level is reduced or increased.

This disclosure describes a solution for such changing backlight level in which a set of color correction matrices are defined in advance (based on a prior panel characterization and calibration). When the panel backlight level is changed, a corresponding color correction matrix can be loaded from memory and applied to the incoming image data to dynamically improve color output. In such cases, if there is no significant color crosstalk between the R, G, and B channels, then a 3×3 or 3×4 color correction matrix may be sufficient for color correction. Again, one example of a color correction technique, in this example, using linear regression 3 by 4 matrix may comprise application of the following:

$$R_{cie} = k_{rr}*R_d + k_{rg}*G_d + k_{rb}*B_d + C_r$$

$$G_{cie} = k_{gr}*R_d + k_{gg}*G_d + k_{gb}*B_d + C_g$$

$$B_{cie} = k_{br}*R_d + k_{bg}*G_d + k_{bb}*B_d + C_b$$

where black-offset can be applied as: $C_r$, $C_g$, $C_b$. Such techniques may apply to LCD panels, or other transmissive display, as well as OLED panels that do not have any separate backlight source. The remaining coefficients are associated with the contribution of each of the color channels to the color-corrected channel value, as explained in more detail above.

Additionally, the techniques of this disclosure may address a second problem related to gray tracking. The techniques for improving gray tracking may be more widely applicable to LCD panels and OLED panels, as well as other displays that may not implement any backlight modulation or luminance changes. In other words, the gray tracking techniques of this disclosure may be widely applicable to any display that exhibits color channel crosstalk Where a panel display renders all neutral grays (R=G=B from 0 to 255, for a 8-bit display) as gray colors with no hue (achromatic color), the panel may be said to meet a gray tracking condition. It is desirable to meet such a gray tracking condition, but this issue may not be addressed when only 3 1D LUTs are used, particularly when there exists a significant amount of color channel crosstalk (negative or positive) between the R, G and B channels. Gray tracking problems may exist for both LCD panels (with a separate backlight source) and OLED panels (without a separate backlight source). Moreover, Gray tracking problems may exist irrespective of whether the panel luminance is fixed or changed.

Accordingly, to address gray tracking problems (regardless of the type of display), this disclosure proposes an advanced color correction matrix (with much higher number of elements—for example, 3×11), which may be defined based on a priori panel characterization and calibration, as described above. The matrix may be greater than 3 by 3, greater than 3 by 4, and in one example may comprise a 3 by 11 matrix based on a polynomial model, discussed above and shown again below:

$$R_{cie} = a_{01} + a_{11}R_d + a_{21}G_d + a_{31}B_d + a_{41}R_dG_d + a_{51}G_dB_d + a_{61}B_dR_d + a_{71}R^2_d + a_{81}G^2_d + a_{91}a_{91}B^2_d + a_{101}R_dG_dB_d$$

$$G_{cie} = a_{02} + a_{12}R_d + a_{22}G_d + a_{32}B_d + a_{42}R_dG_d + a_{52}G_dB_d + a_{62}B_dR_d + a_{72}R^2_d + a_{82}G^2_d + a_{92}B^2_d + a_{102}R_dG_dB_d$$

$$B_{cie} = a_{03} + a_{13}R_d + a_{23}G_d + a_{33}B_d + a_{43}R_dG_d + a_{53}G_dB_d + a_{63}B_dR_d + a_{73}R^2_d + a_{83}G^2_d + a_{93}B^2_d + a_{103}R_dG_dB_d$$

where black-offset is applied by terms: $a_{01}$, $a_{02}$, $a_{03}$. In this example, the higher order elements (RG, RB, GB, RR, GG, BB and RGB) may be specifically selected to address the color crosstalk between the R, G and B channels. The coefficients in the above equations are associated with the contribution of the color channels, either alone or in combination with other color channels, to the color-corrected channel value, as explained in more detail above.

These two distinct problems (one relating to spectral chroma shift due to changing luminance levels and another relating to cross-talk) may overlap in some, but not all, cases. In particular, these problems may overlap when a panel exhibits significant color crosstalk (gray tracking correction should be addressed) and when the panel luminance changes resulting in spectral or chroma shift.

Consistent with the techniques of this disclosure that concern the problem of changing luminance (e.g., backlight) levels of a display, a method may comprises selecting one of a plurality of color correction matrices for a display based on one of a plurality of luminance levels of the display, and adjusting color image data applied to the display based on the selected color correction matrix. In this case, the display may comprises a backlight display, in which the plurality of luminance levels of the display comprise different backlight modulation levels, or the display may comprise an organic light emitting diode (OLED) display in which the plurality of luminance levels of the display comprise different luminance levels of the OLED display.

In this example, referring to FIG. 1, device 100 may comprise a display 106 configured to operate at different luminance levels, a memory 104 that stores a plurality of color correction sets for the display, and a processor 102 that selects one of the plurality of color correction sets for the display based a current luminance level of the display, and adjusts color image data applied to the backlight display based on the selected color correction set. Again, display 106 may comprises a backlight display, in which the plurality of luminance levels of the display comprise different backlight modulation levels, or the display may comprise an organic light emitting diode (OLED) display in which the plurality of luminance levels of the display comprise different luminance levels of the OLED display.

Consistent with the techniques of this disclosure that concern the problem of gray tracking, a method of adjusting output of a display may comprise applying a color correction matrix to adjust values for different color channels of the display, wherein coefficients of the color correction matrix selected to adjust for cross-talk between the channels, and wherein the color correction matrix is larger than 3 by 3. Applying the color correction matrix may comprise applying a set of equations. The channels may include red, green and blue channels, and applying the color correction matrix comprises applying a 3 by 4 matrix, applying a 3 by 11 matrix, or applying another matrix larger than 3 by 3.

In this example, referring to FIG. 1, device 100 may comprise a display 106, a memory 104 that stores a color correction matrix, wherein coefficients of the color correction matrix selected to adjust for cross-talk between the channels, and wherein the color correction matrix is larger than 3 by 3, and a processor 102 that applies the matrix to adjust values for different color channels of display 106. In this example, display 100 may comprise one or more of a backlight display, a liquid crystal display, an organic light emitting diode (OLED) display, and a display that has fixed luminance output.

In applying the color correction matrix, processor 102 may apply a set of equations. The channels may include red, green and blue channels, and when applying the color correction matrix, the processor may apply a 3 by 4 matrix, a 3 by 11 matrix, or another matrix larger than 3 by 3.

The examples of the techniques of this disclosure address spectral/chroma shifts in a display of a computer device by applying a set of pre-calibrated and pre-defined color correction matrices. It should be understood that the techniques described herein may be extended to more generally to display panels, which may have spectral shifts in the RGB primaries in a more frequent and dynamic way. The RGB primaries of a display panel may be represented with the RGB spectral responses of a display panel as whole, which consists of an illumination source and optical layers used in display panels that include RGB filters. One example of such display panels is iMod (Inteferometric Modulator Display), which uses ambient light as its main light source. In these types of panels, through display calibration and characterization, frequent and dynamic display panel spectral shifts may be modeled using a set of LUTs (single or multi-dimensional), a complex analytical model, or a statistical model, for example. The developed model may then be applied during operation of the device to achieve consistent color performance, in accordance with this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry, such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of calibrating a backlight display device, the method comprising:
generating coefficients of two or more different color correction matrices, one at each of two or more different backlight intensity level settings of the backlight display device, wherein the coefficients adjust each of red, green and blue channels of the backlight display device at the two or more different backlight intensity level settings and wherein the backlight intensity level settings each define a different uniform intensity associated with the entire backlight display, wherein generating the coefficients of a color correction matrix comprises:
receiving a set of reference colors as input;
determining an initial uniform backlight intensity level setting of the backlight display device;
adjusting the backlight display device to have a second uniform backlight intensity level setting of the backlight display device different than the initial uniform backlight intensity level setting, wherein the second uniform backlight intensity level setting results in a displayed set of colors above a threshold error relative to the set of reference colors; and
determining a set of coefficients for each of the red, green, and blue channels corresponding to the second uniform backlight intensity level setting, wherein the determined set of coefficients yields a set of output colors within the threshold error relative to the set of reference colors; and
storing the coefficients of the two or more different color correction matrices in the backlight display device for application in rendering color by the backlight display device at the backlight intensity level settings such that at least two different backlight intensity level settings are associated with different ones of the color correction matrices.

2. The method of claim 1, wherein the coefficients adjust for crosstalk between the red, green, and blue channels.

3. The method of claim 1, further comprising:
generating a lookup table to adjust tone response in each of the red, green, and blue channels of the backlight display device; and
storing the lookup table in the backlight display device for application in rendering color by the backlight display device.

4. The method of claim 1, wherein the backlight intensity level settings are defined as a percentage relative to a maximum backlight display setting.

5. A device comprising:
a backlight display configured to operate at different backlight intensity level settings;

a processor that generates coefficients of two or more different color correction matrices, one at each of two or more different backlight intensity level settings of the backlight display, wherein the coefficients adjust each of red, green and blue channels of the backlight display at the two or more different backlight intensity level settings and wherein the backlight intensity level settings each define a different uniform intensity associated with the entire backlight display, wherein the processor generating the coefficients of a color correction matrix comprises the processor being configured to:

receive a set of reference colors as input;

determine an initial uniform backlight intensity level setting of the backlight display device;

adjust the backlight display device to have a second uniform backlight intensity level setting of the backlight display device different than the initial uniform backlight intensity level setting, wherein the second uniform backlight intensity level setting results in a displayed set of colors above a threshold error relative to the set of reference colors; and determine a set of coefficients for each of the red, green, and blue channels corresponding to the second uniform backlight intensity level setting, wherein the determined set of coefficients yields a set of output colors within the threshold error relative to the set of reference colors; and a memory for storing the coefficients of the two or more different color correction matrices in the backlight display for application in rendering color by the backlight display at the backlight intensity level settings such that at least two different backlight intensity level settings are associated with different ones of the color correction matrices.

6. The device of claim 5, wherein the coefficients adjust for crosstalk between the red, green, and blue channels.

7. The device of claim 5, wherein the processor further:

generates a lookup table to adjust tone response in each of the red, green, and blue channels of the backlight display; and stores in the memory the lookup table in the backlight display for application in rendering color by the backlight display.

8. The device of claim 5, wherein the backlight intensity level settings are applied as a percentage relative to a maximum backlight display setting.

9. A device comprising:

means for generating coefficients of two or more different color correction matrices, one at each of two or more different backlight intensity level settings of a backlight display, wherein the coefficients adjust each of red, green and blue channels of the backlight display at the two or more different backlight intensity level settings and wherein the backlight intensity level settings each define a different uniform intensity associated with the entire backlight display, wherein the means for generating the coefficients of a color correction matrix comprises:

means for receiving a set of reference colors as input;

means for determining an initial uniform backlight intensity level setting of the backlight display device;

means for adjusting the backlight display device to have a second uniform backlight intensity level setting of the backlight display device different than the initial uniform backlight intensity level setting, wherein the second uniform backlight intensity level setting results in a displayed set of colors above a threshold error relative to the set of reference colors; and means for determining a set of coefficients for each of the red, green, and blue channels corresponding to the second uniform backlight intensity level setting, wherein the determined set of coefficients yields a set of output colors within the threshold error relative to the set of reference colors; and means for storing the coefficients of the two or more different color correction matrices in the backlight display for application in rendering color by the backlight display at the backlight intensity level settings such that at least two different backlight intensity level settings are associated with different ones of the color correction matrices.

10. The device of claim 9, wherein the coefficients adjust for crosstalk between the red, green, and blue channels.

11. The device of claim 9, further comprising:

means for generating a lookup table to adjust tone response in each of the red, green, and blue channels of the backlight display; and means for storing the lookup table in the backlight display for application in rendering color by the backlight display.

12. The device of claim 9, wherein the backlight intensity level settings are defined as a percentage relative to a maximum backlight display setting.

13. A computer-readable storage medium comprising instructions that upon execution in a processor, cause the processor to:

generate coefficients of two or more different color correction matrices, one at each of two or more different backlight intensity level settings of a backlight display device, wherein the coefficients adjust each of red, green and blue channels of the backlight display device at the two or more different backlight intensity level settings and wherein the backlight intensity level settings each define a different uniform intensity associated with the entire backlight display, wherein the instructions that cause the processor to generate the coefficients of a color correction matrix comprise instructions that cause the processor to:

receive a set of reference colors as input;

determine an initial uniform backlight intensity level setting of the backlight display device;

adjust the backlight display device to have a second uniform backlight intensity level setting of the backlight display device different than the initial uniform backlight intensity level setting, wherein the second uniform backlight intensity level setting results in a displayed set of colors above a threshold error relative to the set of reference colors; and determine a set of coefficients for each of the red, green, and blue channels corresponding to the second uniform backlight intensity level setting, wherein the determined set of coefficients yields a set of output colors within the threshold error relative to the set of reference colors; and store the coefficients of the two or more different color correction matrices in the backlight display device for application in rendering color by the backlight display device at the backlight intensity level settings such that at least two different backlight intensity level settings are associated with different ones of the color correction matrices.

14. The computer-readable medium of claim 13, wherein the coefficients adjust for crosstalk between the red, green, and blue channels.

15. The computer-readable medium of claim 13, further comprising instructions that cause the processor to:
   generate a lookup table to adjust tone response in each of the red, green, and blue channels of the backlight display device; and
   store the lookup table in the backlight display device for application in rendering color by the backlight display device.

16. The computer-readable storage medium of claim 13, wherein the backlight intensity level settings are defined as a percentage relative to a maximum backlight display setting.

\* \* \* \* \*